US012598636B2

(12) United States Patent　　(10) Patent No.:　US 12,598,636 B2

Kim　　(45) Date of Patent:　Apr. 7, 2026

(54) METHOD AND APPARATUS FOR TRANSMITTING SIGNAL IN WIRELESS COMMUNICATION SYSTEM

(71) Applicant: LG ELECTRONICS INC., Seoul (KR)

(72) Inventor: Hyunmin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 439 days.

(21) Appl. No.: 18/015,925

(22) PCT Filed: Aug. 20, 2021

(86) PCT No.: PCT/KR2021/011074

§ 371 (c)(1),
(2) Date: Jan. 12, 2023

(87) PCT Pub. No.: WO2022/039541

PCT Pub. Date: Feb. 24, 2022

(65) Prior Publication Data

US 2023/0276487 A1　　Aug. 31, 2023

(30) Foreign Application Priority Data

Aug. 21, 2020　　(KR) ........................ 10-2020-0105482
Sep. 2, 2020　　(KR) ........................ 10-2020-0111891

(51) Int. Cl.
*H04W 72/566*　　(2023.01)
*H04W 72/044*　　(2023.01)
(Continued)

(52) U.S. Cl.
CPC ..... *H04W 72/569* (2023.01); *H04W 72/0446* (2013.01); *H04W 72/046* (2013.01); *H04W 72/25* (2023.01)

(58) Field of Classification Search
None
See application file for complete search history.

(56) References Cited

U.S. PATENT DOCUMENTS

2019/0261411 A1* 8/2019 Chin ................. H04W 74/0838
2019/0289639 A1* 9/2019 Frenger ............... H04W 72/046
(Continued)

FOREIGN PATENT DOCUMENTS

WO　　2020-125424 A1　　6/2020

OTHER PUBLICATIONS

Fujitsu, "Discussion of Sidelink Synchronization Mechanism for NR V2X", R1-1912081, 3GPP TSG RAN WG1 #99, Reno, USA, Nov. 8, 2019, See Sections 2.1-2.2, 2.5; 및 도면 2.
(Continued)

*Primary Examiner* — Gregory B Sefcheck
*Assistant Examiner* — Benjamin Peter Welte
(74) *Attorney, Agent, or Firm* — BRYAN CAVE LEIGHTON PAISNER LLP

(57) ABSTRACT

A method of operating a terminal in a wireless communication system is disclosed. The method of operating the terminal may comprise the terminal receiving one or more synchronization signal bocks (SSBs), selecting an SSB from among the one or more SSBs based on priority, generating at least one SSB group based on the selected SSB and a cyclic prefix (CP) boundary, and transmitting an indication message. The priority may be based on channel measurement and synchronization reference, the indication message may comprise slot configuration information based on the at least one SSB group.

17 Claims, 28 Drawing Sheets

(51) Int. Cl.
    *H04W 72/0446*     (2023.01)
    *H04W 72/25*     (2023.01)

(56)       References Cited

U.S. PATENT DOCUMENTS

| | | | |
|---|---|---|---|
| 2020/0196254 A1* | 6/2020 | Kerhuel | H04W 72/30 |
| 2021/0266215 A1* | 8/2021 | Park | H04L 27/2657 |
| 2021/0368466 A1* | 11/2021 | Fakoorian | H04W 56/0015 |
| 2022/0338219 A1* | 10/2022 | Ding | H04W 72/23 |
| 2023/0292271 A1* | 9/2023 | Zou | H04W 56/001 |

OTHER PUBLICATIONS

OPPO, "Draft Text Proposals on Physical Layer Structure for NR-V2X", R1-2000489, 3GPP TSG RAN WG1 #100, e-Meeting, Feb. 14, 2020, See Sections 2.1, 2.3.
Huawei, "Sidelink Synchronization Mechanisms for NR V2X", R1-1911885, 3GPP TSG RAN WG1 Meeting #99, Reno, USA, Nov. 9, 2019, See Section 2.
OPPO, "Discussion of Synchronization Mechanism for NR-V2X", R1-1906474, 3GPP TSG RAN WG1 #97, Reno, USA, May 3, 2019 See Sections 2.3-2.7.

\* cited by examiner

● : Transmitting terminal

◎ : Transmitting terminal

● : Transmitting terminal

▨ : Transmitting terminal

● : Transmitting terminal

▨ : Transmitting terminal

| AGC | S-PSS | S-PSS | S-SSS | S-SSS | PBCH | PBCH | PBCH | PBCH | PBCH | PBCH | PBCH | PBCH | switch |
|-----|-------|-------|-------|-------|------|------|------|------|------|------|------|------|--------|

FIG. 7B

METHOD AND APPARATUS FOR TRANSMITTING SIGNAL IN WIRELESS COMMUNICATION SYSTEM

CROSS-REFERENCE TO RELATED APPLICATIONS

This application is the National Stage filing under 35 U.S.C. § 371 of International Application No. PCT/KR2021/011074, filed on Aug. 20, 2021, which claims the benefit of Korean Patent Application No. 10-2020-0105482, filed on Aug. 21, 2020, and Korean Patent Application No. 10-2020-0111891, filed on Sep. 2, 2020 the contents of which are all hereby incorporated by reference herein in their entirety.

TECHNICAL FIELD

The following description relates to a wireless communication system, and, more particularly, to data transmission and reception and resource pool allocation in a wireless communication system. Specifically, it relates to a data transmission and reception method and resource pool allocation in mmWave sidelink.

BACKGROUND

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a method of transmitting and receiving data and allocating a resource pool in a wireless communication system.

The present disclosure relates to a data transmission and reception and resource allocation method related to mmWave sidelink.

The technical objects to be achieved in the present disclosure are not limited to the above-mentioned technical objects, and other technical objects that are not mentioned may be considered by those skilled in the art through the embodiments described below.

As an example of the present disclosure, a terminal may operate as follows. A method of operating a terminal may comprise the terminal receiving one or more synchronization signal bocks (SSBs), selecting an SSB from among the one or more SSBs based on priority, generating at least one SSB group based on the selected SSB and a cyclic prefix (CP) boundary, and transmitting an indication message. The priority may be based on channel measurement and synchronization reference. The indication message may comprise slot configuration information based on the at least one SSB group. The slot configuration may be performed for each beam. A beam received by the terminal may have a plurality of SSB groups, and the terminal may additionally allocate one slot to the received beam. A 2-bit reserved period of a physical broadcast channel (PBCH) included in the one or more SSBs may comprise a cast-type related parameter. A slot may be configured for each beam based on the cast-type parameter. The terminal may determine the cast-type related parameter of a broadcast type and may not transmit the indication message. The indication message may be transmitted through a physical sidelink control channel (PSCCH). The PSCCH may be scrambled based on a sidelink synchronization signal (SLSS) ID. The SLSS ID may be based on the one or more SSBs. The terminal may select a resource pool based on the one or more SSBs. The resource pool may be allocated based on priority of a content type of a PBCH included in SSBs in the SSB group. The indication message may comprise reserve symbol and reserve subchannel information based on the allocated resource pool information. The resource pool may be allocated based on resources of a beam different from a beam to which the received SSBs belong.

As an example of the present disclosure, a terminal may comprise a transceiver and a processor connected to the transceiver. The processor may control the transceiver to receive one or more synchronization signal blocks (SSBs). The processor may control the terminal performs to select an SSB from among the one or more SSBs based on priority. The processor may perform control to generate at least one SSB group based on the selected SSB and a cyclic prefix (CP) boundary. The processor may control the transceiver to transmit an indication message. The priority may be based on channel measurement and synchronization reference. The indication message may comprise slot configuration information based on the at least one SSB group. The slot configuration may be performed for each beam. A beam received by the terminal may have a plurality of SSB groups. The processor may perform control to additionally allocate one slot to the received beam. A 2-bit reserved period of a physical broadcast channel (PBCH) included in the one or more SSBs may comprise a cast-type related parameter. A slot may be configured for each beam based on the cast-type parameter. The processor may perform control to determine the cast-type related parameter of a broadcast type. The processor may control the transceiver not to transmit the indication message. The indication message may be transmitted through a physical sidelink control channel (PSCCH). The PSCCH may be scrambled based on a sidelink synchronization signal (SLSS) ID. The SLSS ID may be based on the one or more SSBs. The processor may perform control to select a resource pool based on the one or more SSBs. The resource pool may be allocated based on priority of a content type of a PBCH included in SSBs in the SSB group. The indication message may comprise reserve symbol and reserve subchannel information based on the allocated resource pool information. The resource pool may be allocated based on resources of a beam different from a beam to which the received SSBs belong.

As an example of the present disclosure, a first terminal may operate as follows. A method of operating a first terminal may comprise the first terminal transmitting one or more synchronization signal block (SSB) to a second terminal and receiving an indication message from the second terminal. The indication message may comprise slot configuration information based on at least one SSB group, and the slot configuration is performed for each beam. The at least one SSB group may be generated by an SSB selected by the second terminal and a cyclic prefix (CP) boundary. The SSB selected by the second terminal may be selected from among one or more SSBs received by the second terminal based on priority. The priority may be based on channel measurement and synchronization reference.

As an example of the present disclosure, a first terminal may comprise a transceiver and a processor connected to the transceiver. The processor may control the transceiver to transmit one or more synchronization signal bocks (SSBs) to a second terminal and controls the transceiver to receive an indication message from the second terminal. The indication message may comprise slot configuration information based on at least one SSB group. The slot configuration may be performed for each beam. The at least one SSB group may be generated by an SSB selected by the second terminal and a cyclic prefix (CP) boundary. The SSB selected by the second terminal may be selected from among one or more SSBs received by the second terminal based on priority, and the priority may be based on channel measurement and synchronization reference.

As an example of the present disclosure, an apparatus may comprise at least one memory and at least one processor functionally connected to the at least one memory. The at least one processor may control the apparatus to receive one or more synchronization signal bocks (SSBs). The at least one processor may control the apparatus to select an SSB from among the one or more SSBs based on priority. The at least one processor may control the apparatus to generate at least one SSB group based on the selected SSB and a cyclic prefix (CP) boundary. The at least one processor may control the apparatus to transmit an indication message. The priority may be based on channel measurement and synchronization reference. The indication message may comprise slot configuration information based on the at least one SSB group. The slot configuration may be performed for each beam.

As an example of the present disclosure, a non-transitory computer-readable medium may store at least one instruction. The computer-readable medium may comprise the at least one instruction executable by a processor. At least one instruction may instruct the computer-readable medium to receive one or more synchronization signal bocks (SSBs). The at least one instruction may instruct the computer-readable medium to select an SSB from among the one or more SSBs based on priority. The at least one instruction may instruct the computer-readable medium to generate at least one SSB group based on the selected SSB and a cyclic prefix (CP) boundary. The at least one instruction may instruct the computer-readable medium to transmit an indication message. The priority may be based on channel measurement and synchronization reference. The indication message may comprise slot configuration information based on the at least one SSB group. The slot configuration may be performed for each beam.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, a plurality of terminals having different slot indices can transmit and receive data.

According to the present disclosure, since each terminal is allocated a resource pool in a sidelink, interference can be reduced.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

FIGS. 7A to 7C are diagrams related to an operation of a terminal applicable to the present disclosure.

DETAILED DESCRIPTION

Figure 1:
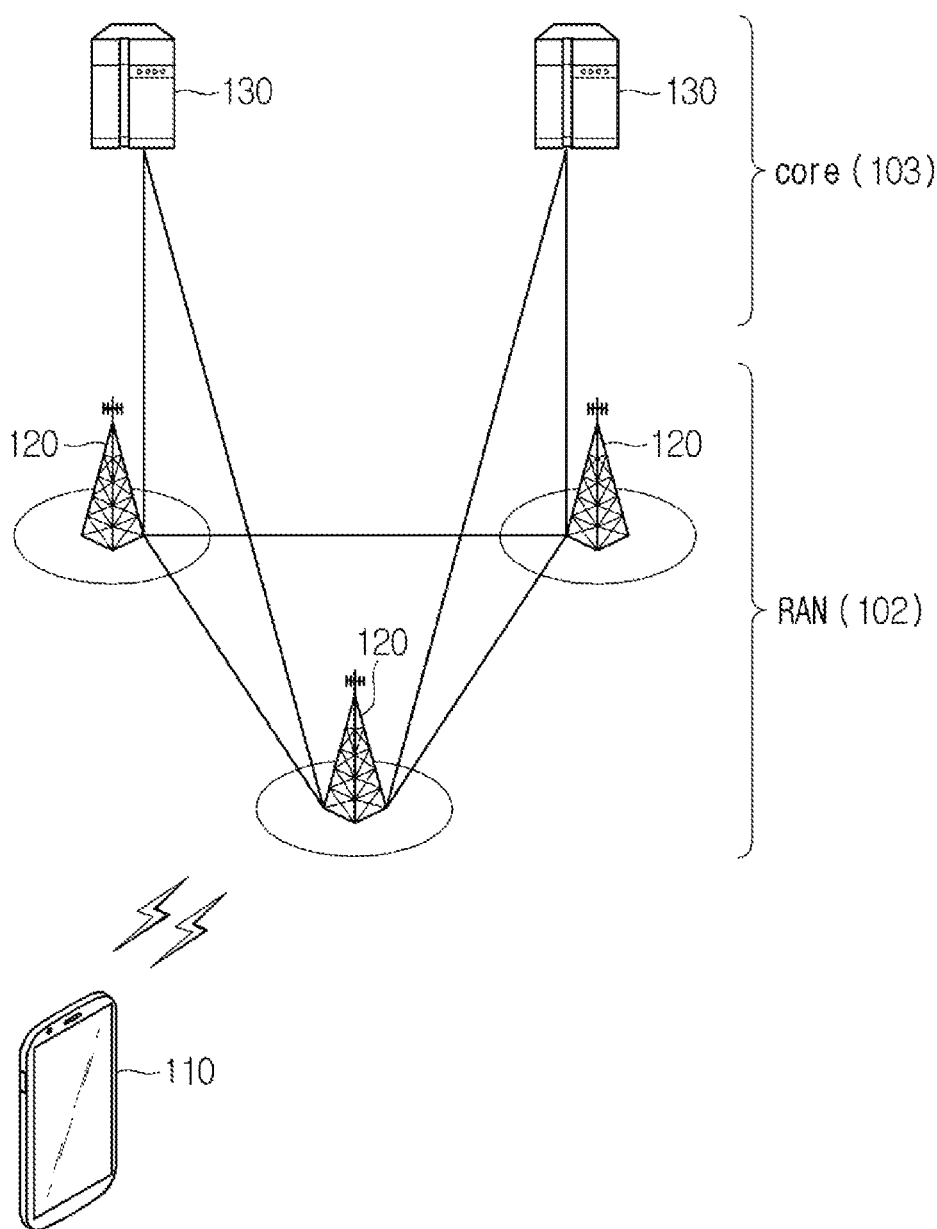
FIG. 1 illustrates a structure of a wireless communication system according to an embodiment of the present disclosure.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present specification may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

Communication System Applicable to the Present Disclosure

FIG. 1 illustrates a structure of a wireless communication system according to an embodiment of the present disclosure. The embodiment of FIG. 1 may be combined with various embodiments of the present disclosure.

Referring to FIG. 1, a wireless communication system includes a radio access network (RAN) 102 and a core network 103. The radio access network 102 includes a base station 120 that provides a control plane and a user plane to a terminal 110. The terminal 110 may be fixed or mobile, and may be called other terms such as a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called other terms such as a fixed station, a Node B, an eNB (eNode B), a gNB (gNode B), an ng-eNB, an advanced base station (ABS), an access point, a base transceiver system (BTS), or an access point (AP). The core network 103 includes a core network entity 130. The core network entity 130 may be defined in various ways according to functions, and may be called other terms such as a core network node, a network node, or a network equipment.

Components of a system may be referred to differently according to an applied system standard. In the case of the LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of the terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of the 5G NR standard, the radio access network 102 may be referred to as an NG-RAN, and the core network 103 may be referred to as a 5GC (5G core). In this case, the core network 103 includes an access and mobility management function (AMF), a user plane function (UPF), and a session management function (SMF). The AMF provides a function for access and mobility management in units of terminals, the UPF performs a function of mutually transmitting data units between an upper data network and the radio access network 102, and the SMF provides a session management function.

The BSs 120 may be connected to one another via Xn interface. The BS 120 may be connected to one another via core network 103 and NG interface. More specifically, BSs 130 may be connected to an access and mobility management function (AMF) via NG-C interface, and may be connected to a user plane function (UPF) via NG-U interface.

V2X or Sidelink Communication

Figure 2A:
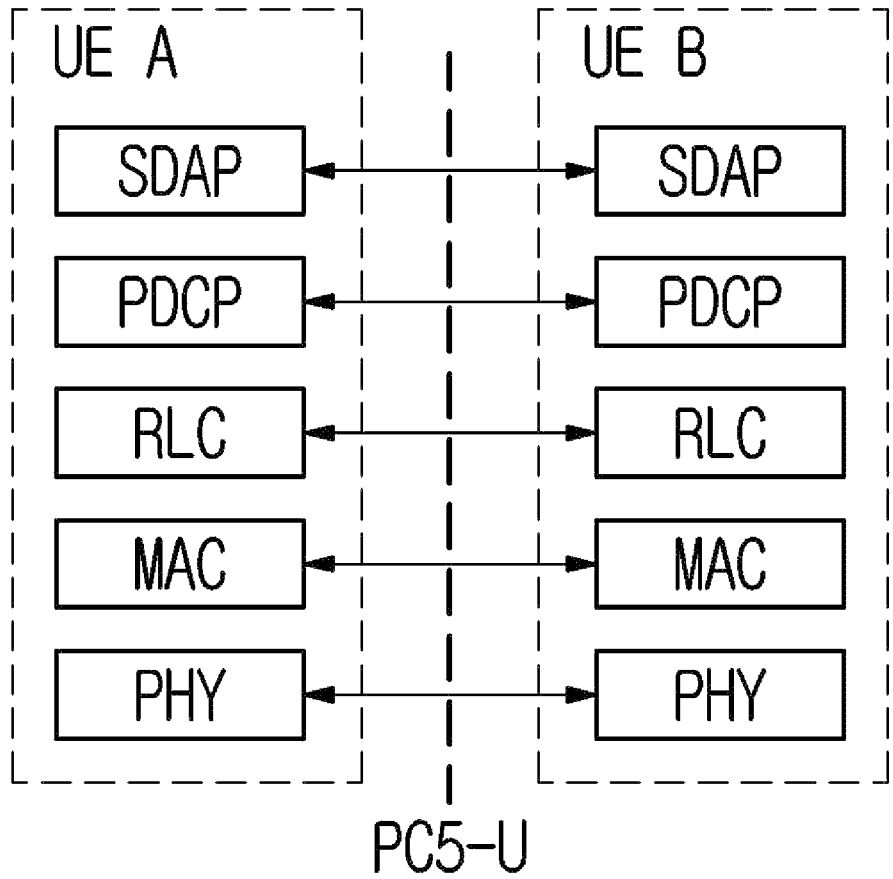
FIGS. 2A and 2B illustrate a radio protocol architecture for a SL communication according to an embodiment of the present disclosure.
Figure 2B:
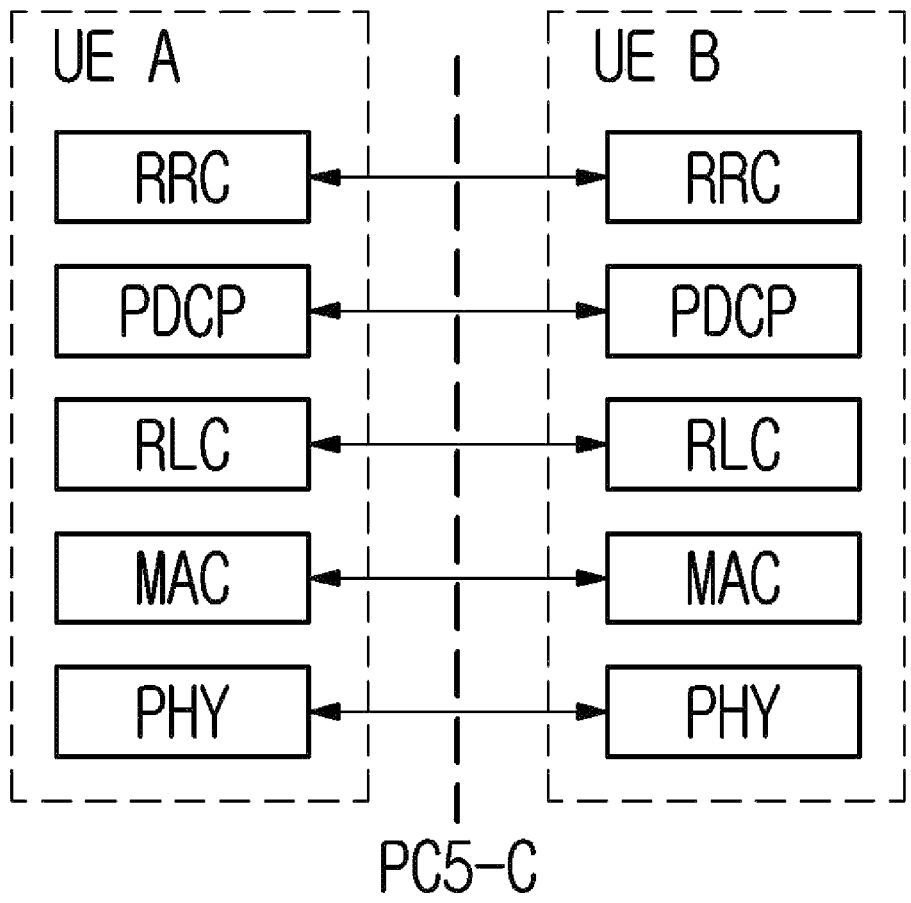

FIGS. 2A and 2B illustrate a radio protocol architecture for a SL communication applicable to the present disclosure. The embodiment of FIGS. 2A and 2B may be combined with various embodiments of the present disclosure. More specifically, FIG. 2A exemplifies a user plane protocol stack, and FIG. 2B exemplifies a control plane protocol stack.

Sidelink Synchronization Signal (SLSS) and Synchronization Information

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL|DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

For example, the UE may generate S-SS/PSBCH block (that is, S-SSB), and the UE may transmit S-SS/PSBCH block (that is, S-SSB) by mapping it on a physical resource.

Synchronization Acquisition of SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 3:
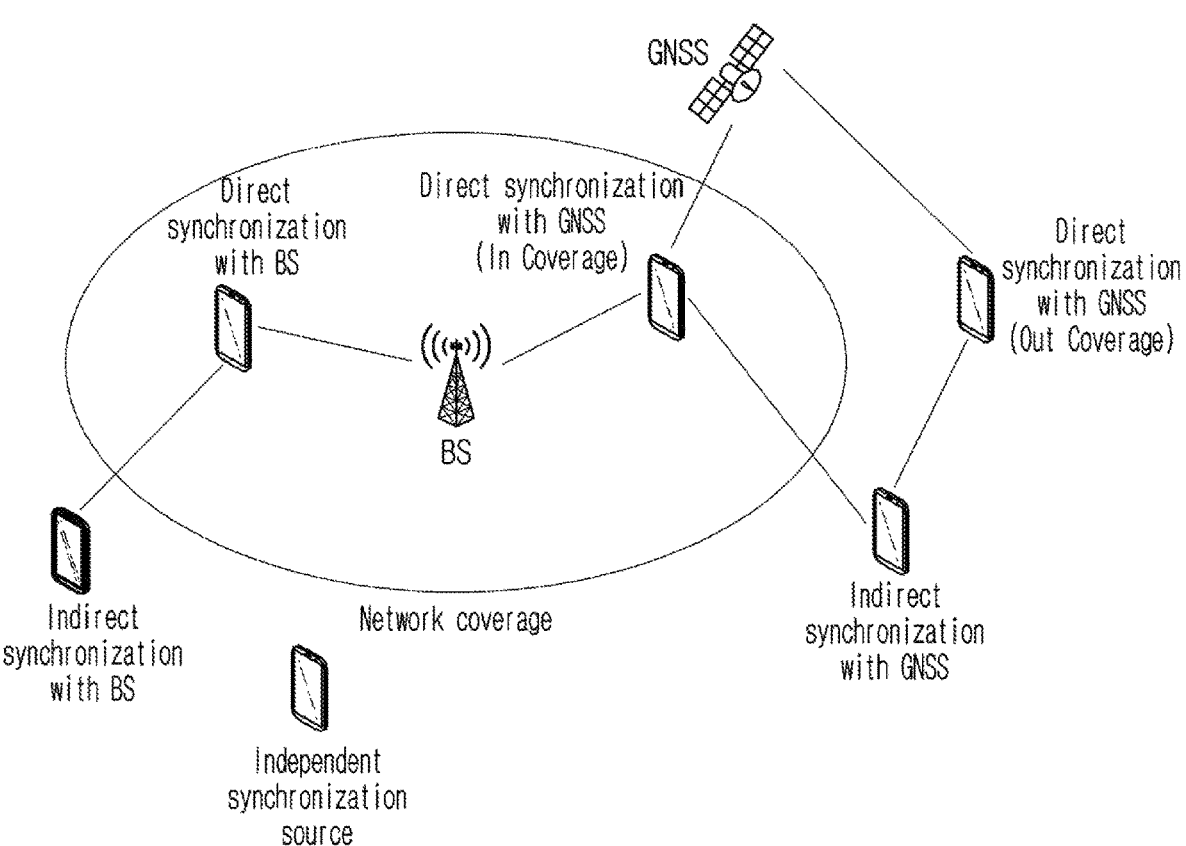
FIG. 3 illustrates a synchronization source or synchronization reference of V2X according to an embodiment of the present disclosure.

FIG. 3 illustrates a synchronization source or synchronization reference of V2X applicable to the present disclosure. The embodiment of FIG. 8 may be combined with various embodiments of the present disclosure.

Referring to FIG. 3, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 1

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 1] or [Table 2], P0 may represent a highest priority, and P6 may represent a lowest priority. In [Table 1] or [Table 2], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the UE may (re)select a synchronization reference, and the UE may obtain synchronization from the synchronization reference. In addition, the UE may perform SL communication (e.g., PSCCH/PSSCH transmission/reception, physical sidelink feedback channel (PSFCH) transmission/reception, S-SSB transmission/reception, reference signal transmission/reception, etc.) based on the obtained synchronization.

Figure 4A:
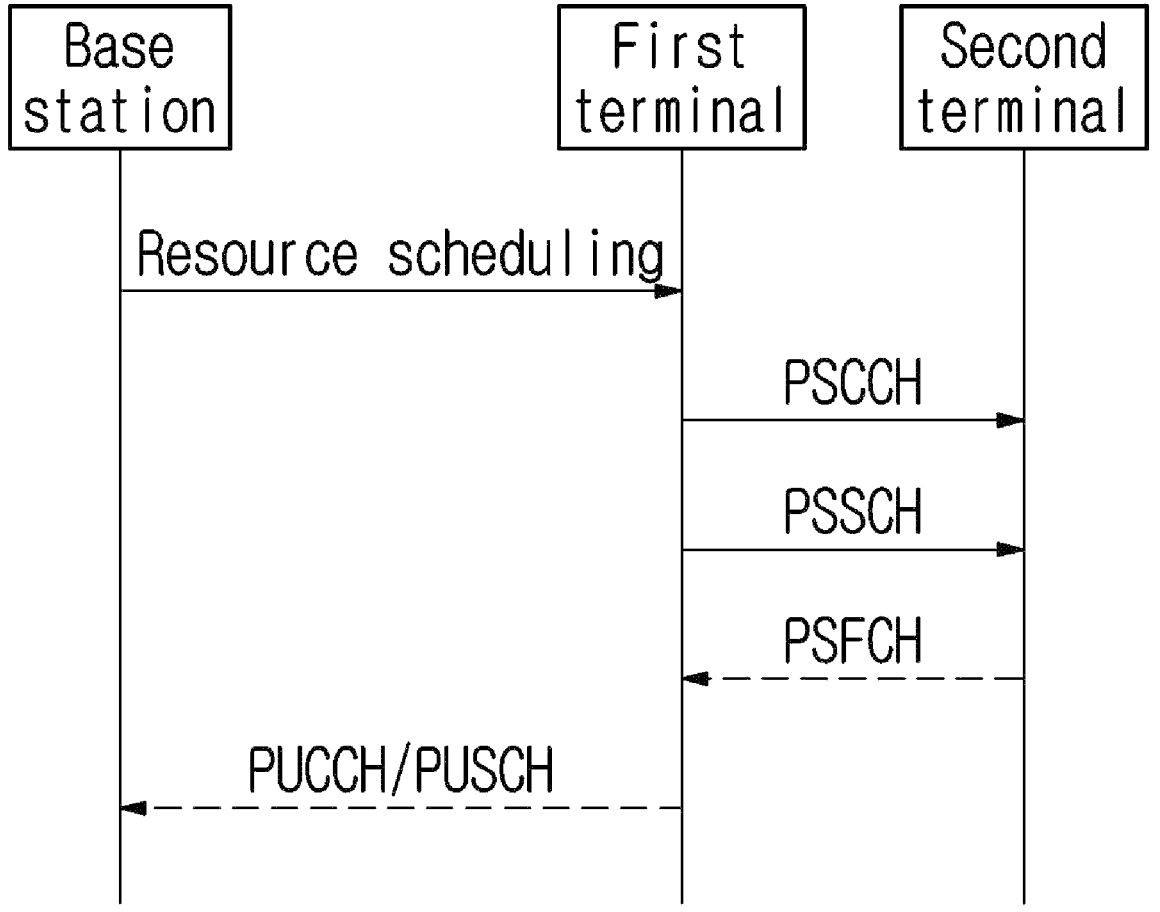
FIGS. 4A and 4B illustrate a procedure of performing V2X or SL communication by a terminal based on a transmission mode according to an embodiment of the present disclosure.
Figure 4B:
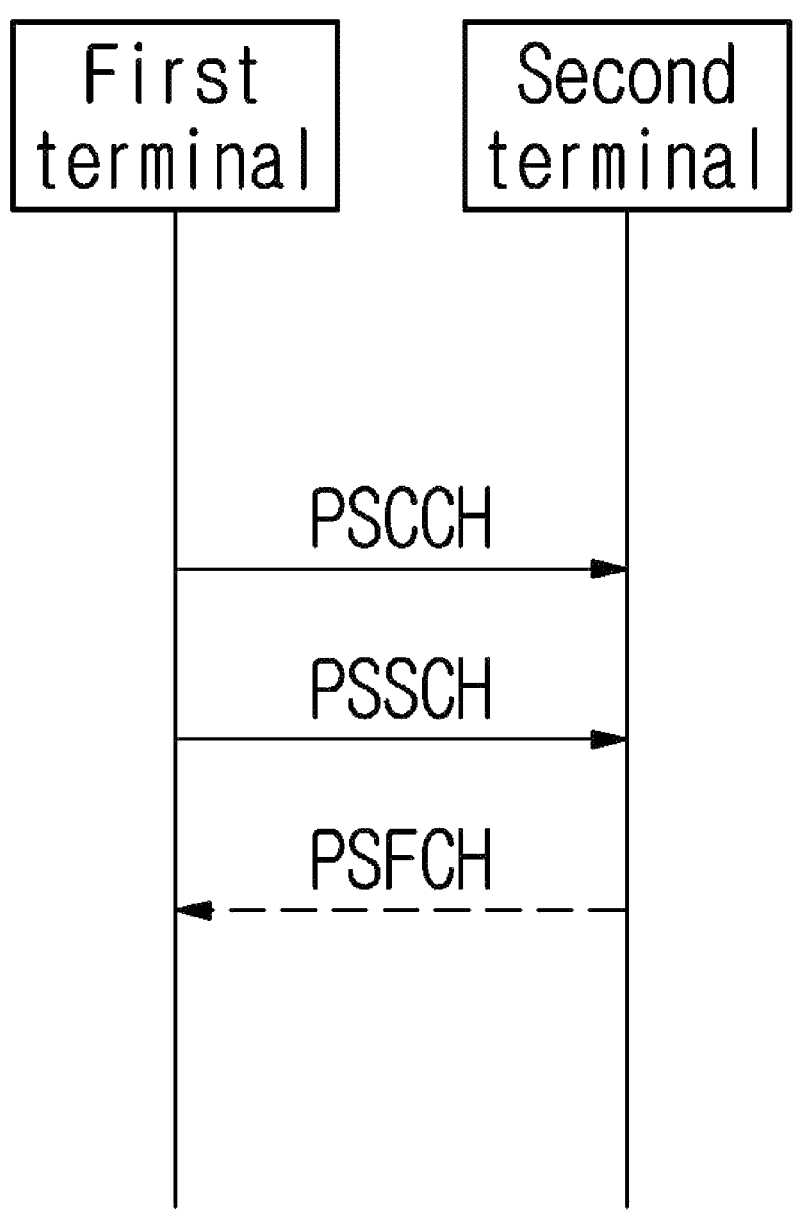

FIGS. 4A and 4B illustrate a procedure of performing V2X or SL communication by a terminal based on a transmission mode applicable to the present disclosure. The embodiment of FIGS. 4A and 4B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 4A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 4B exemplifies a UE operation related to an LTE transmission mode 2 or an LTE transmission mode 4. Alternatively, for example, FIG. 4A exemplifies a UE operation related to an NR resource allocation mode 2.

Referring to FIG. 4A, in the LTE transmission mode 1, the LTE transmission mode 3, or the NR resource allocation mode 1, a BS may schedule an SL resource to be used by the UE for SL transmission. For example, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource (s) to the first UE, and the base station may transmit a DCI related to activation or release of the CG resource(s) to the first UE.

Subsequently, the first UE may transmit a PSCCH (e.g., sidelink control information (SCI) or $1^{st}$-stage SCI) to a second UE based on the resource scheduling. After then, the first UE may transmit a PSSCH (e.g., $2^{nd}$-stage SCI, MAC PDU, data, etc.) related to the PSCCH to the second UE. After then, the first UE may receive a PSFCH related to the PSCCH/PSSCH from the second UE. For example, HARQ feedback information (e.g., NACK information or ACK information) may be received from the second UE through the PSFCH. After then, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 4 shows an example of a DCI for SL scheduling. Referring to FIG. 4B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannel(s). For example, subsequently, a first UE which has selected resource(s) from a resource pool by itself may transmit a PSCCH (e.g., sidelink control information (SCI) or $1^{st}$-stage SCI) to a second UE by using the resource(s). After then, the first UE may transmit a PSSCH (e.g., $2^{nd}$-stage SCI, MAC PDU, data, etc.) related to the PSCCH to the second UE. In step S8030, the first UE may receive a PSFCH related to the PSCCH/PSSCH from the second UE.

Referring to FIGS. 4A and 4B, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B. Table 5 shows an example of a $1^{st}$-stage SCI format.

Referring to FIG. 4A or 4B, the first UE may receive the PSFCH. For example, the first UE and the second UE may determine a PSFCH resource based on Table 7, and the second UE may transmit HARQ feedback to the first UE using the PSFCH resource.

Referring to FIG. 4A, the first UE may transmit SL HARQ feedback to the base station through the PUCCH and/or the PUSCH.

Figure 5A:
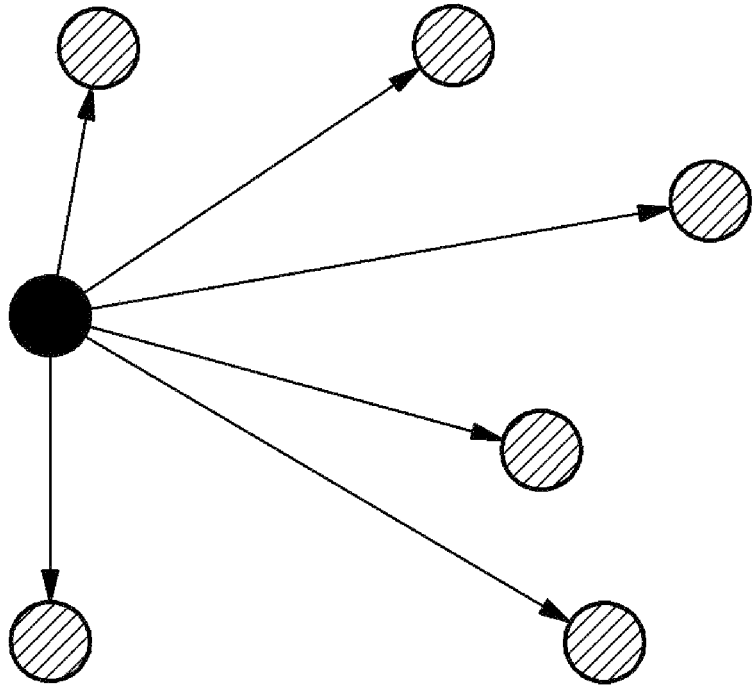
FIGS. 5A to 5C illustrate three cast types according to an embodiment of the present disclosure.
Figure 5B:
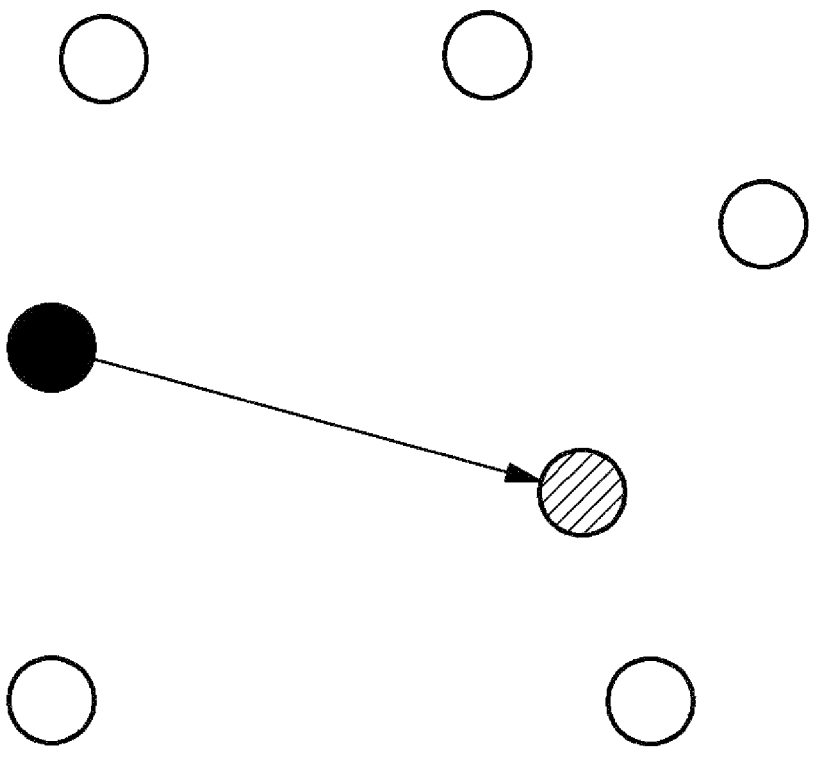
Figure 5C:
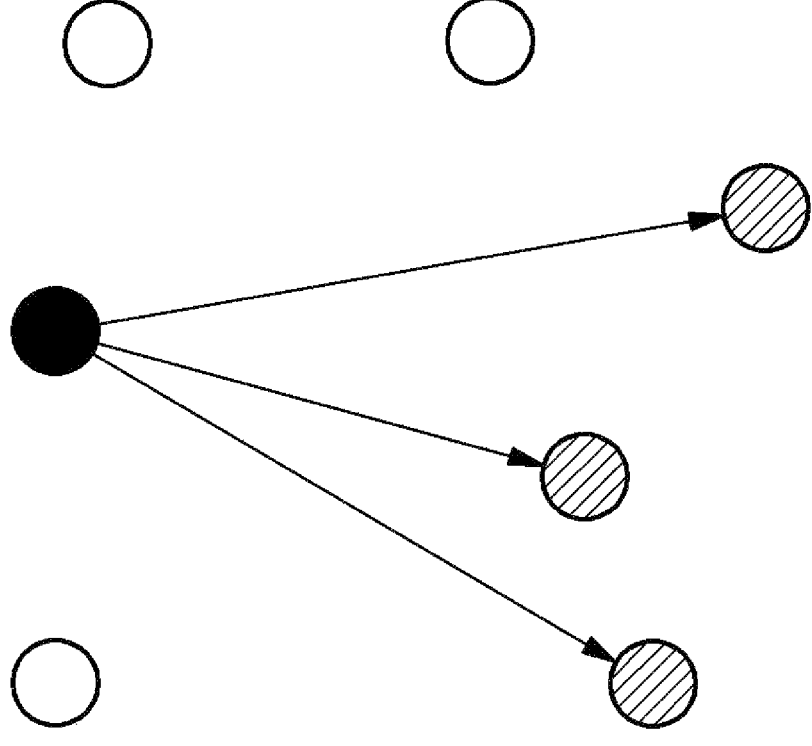

FIGS. 5A to 5C illustrate three cast types applicable to the present disclosure. The embodiment of FIGS. 5A to 5C may be combined with various embodiments of the present disclosure.

Specifically, FIG. 5A exemplifies broadcast-type SL communication, FIG. 5B exemplifies unicast type-SL communication, and FIG. 5C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (HARQ) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In the present disclosure, HARQ-ACK may be referred to as ACK, ACK information, or positive-ACK information, and HARQ-NACK may be referred to as NACK, NACK information, or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Specific Embodiments of the Present Disclosure

A synchronization operation may be performed based on a synchronization signal block (SSB) and a physical broadcast channel (PBCH). This synchronization operation is an operation in which a terminal selects one SSB from among a plurality of SSBs and performs time synchronization based on the PBCH. When a terminal receives multiple SSBs in a beam-based sidelink, the SSBs transmitted by terminals based on different references may be received in one beam due to beam characteristics. In this case, the terminal may select one SSB and receive data from one terminal. When the terminal wants to receive a service from a plurality of terminals, it cannot be determined that the plurality of terminals have the same reference. Therefore, it cannot be determined that the terminal may receive services from the plurality of terminals at the same time, and the terminal may receive services from the plurality of terminals sequentially. The present disclosure proposes a method of applying a resource pool that may only be used by a specific terminal based on SSB grouping when the terminal receives multiple SSBs.

In long term evolution (LTE) or new radio (NR), an SSB transmission pattern of a terminal is not defined. In the case of NR, the SSB may have a period of 20 ms by default. After receiving the SSB, the terminal may know an exact SSB period through a periodic parameter included in system information block 1 (SIB1). An SSB may be mapped to Slot 0. The present disclosure proposes a method of enabling a terminal to manage an allowable number of SSBs received in various patterns. For example, the terminal may simultaneously configure an SSB/PBCH indicating Slot 0 and Slot 1 and receive data.

Terminals that transmit and receive data based on a vehicle to everything (V2X) PC5 interface may move at a high speed. Accordingly, synchronization references of terminals may be changed aperiodically. In addition, the terminal may become a synchronization reference terminal and transmit the SSB/PBCH. The period of the SSB may be 16 frames by default. Slot index configuration may be configured through a RRC parameter and an S-SS/PSBCH block index. Here, the RRC parameter may include timeOffsetSSB-SL and timeIntervalSSB-SL. SSB/PBCH transmission slots may vary according to the terminal. For example, each terminal may configure an SS/PBCH transmission slot based on a RRC parameter including timeOffsetSSB-SL and timeIntervalSSB-SL. LTE V2X only supports broadcasting and the pattern of the SSB/PBCH is fixed. Therefore, in LTE V2X, even if a terminal uses synchronization of one of a plurality of SSBs as a reference, data may be received from a plurality of terminals. In contrast, in beam-based V2X, slot indices of a plurality of SSBs received by the terminal may be different from each other. Accordingly, the probability that the terminal may receive data from other terminals based on the reference of one SSB is low. In addition, even if a terminal receives data from another terminal, it is not clear when to provide feedback. The present disclosure proposes a solution to this problem. Specifically, the present disclosure proposes a method of enabling a reception terminal to group terminals which transmit SSBs based on slot indices when the terminal receives the plurality of SSBs. In addition, the present disclosure proposes a resource pool that may be used by a specific terminal based on grouping.

Accordingly, the present disclosure enables a terminal to perform transmission and reception to and from a plurality of terminals having different slot indices in beam-based V2X communication. In addition, since the reception terminal allocates a resource pool to each terminal, there is an effect of mitigating interference.

Regarding V2X synchronization, when receiving multiple SSBs, the terminal may perform time synchronization with an SSB having high priority and receive data. Due to characteristics of V2X terminals having mobility and different references, there is a possibility that the terminal cannot decode data received from multiple terminals through synchronization (sync) of one SSB. The present disclosure proposes SSB grouping to solve this problem. Accordingly, the V2X terminal may maintain and manage a plurality of synchronization timings.

Figure 6:
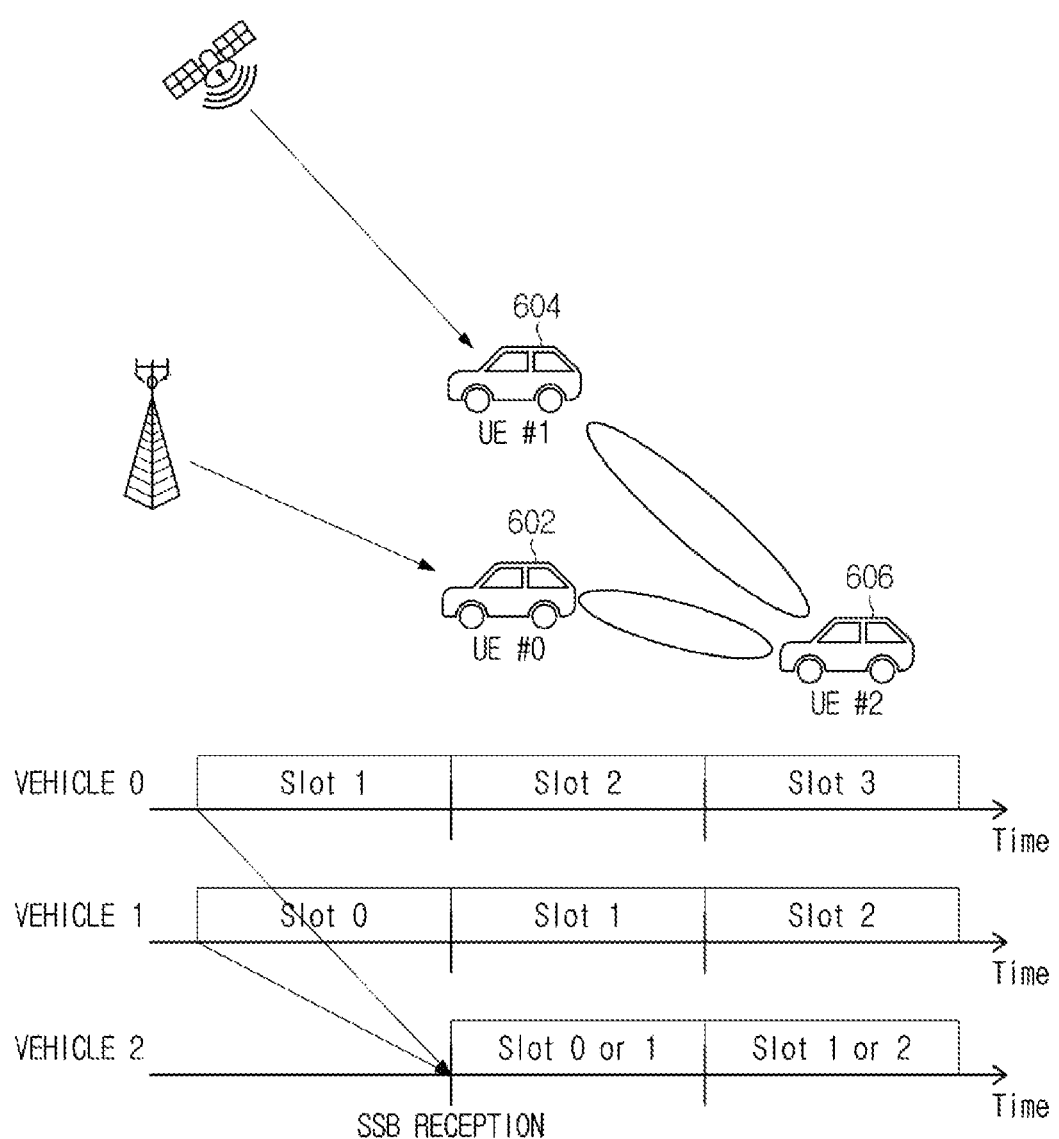
FIG. 6 is a diagram illustrating an example of a terminal operation applicable to the present disclosure.

FIG. 6 is a diagram illustrating an example of a terminal (UE) operation applicable to the present disclosure. Assume an out of coverage or partial coverage environment. Assume that multiple terminals are transmitting SSBs to UE #2 606. In V2X, the terminal may determine a synchronization time (reference time) based on global navigation satellite system (GNSS) or base station or its own time information. Referring to FIG. 6, UE #0 602 and UE #1 604 may maintain the reference time through different references. UE #1 604 may receive a signal directly from a satellite. UE #0 602 may receive a signal from a base station. The reception timing of UE #0 may be delayed by buildings, trees, and other obstacles. Accordingly, different terminals (UEs) may operate in synchronization with different timings. For example, UE #0 602 may indicate Slot 1, and UE #1 604 may indicate Slot 0. UE #0 and UE #1 may transmit SSBs to UE #2 606 for data transmission. In the case of LTE V2X, a terminal, which has received an SSB, may synchronize with one SSB among a plurality of SSBs according to priority. In the case of LTE V2X, the terminal may receive the broadcast SSB. Therefore, the reception terminal may receive data transmitted by multiple terminals even if it is located on a CP boundary. In the case of NR V2X, when a terminal is synchronized based on one SSB, it may be difficult to transmit a feedback message to terminals having different timings. A feedback transmission period related to feedback timing may be set based on a physical sidelink feedback channel (PSFCH) configuration parameter in a resource pool configuration.

Figure 7A:
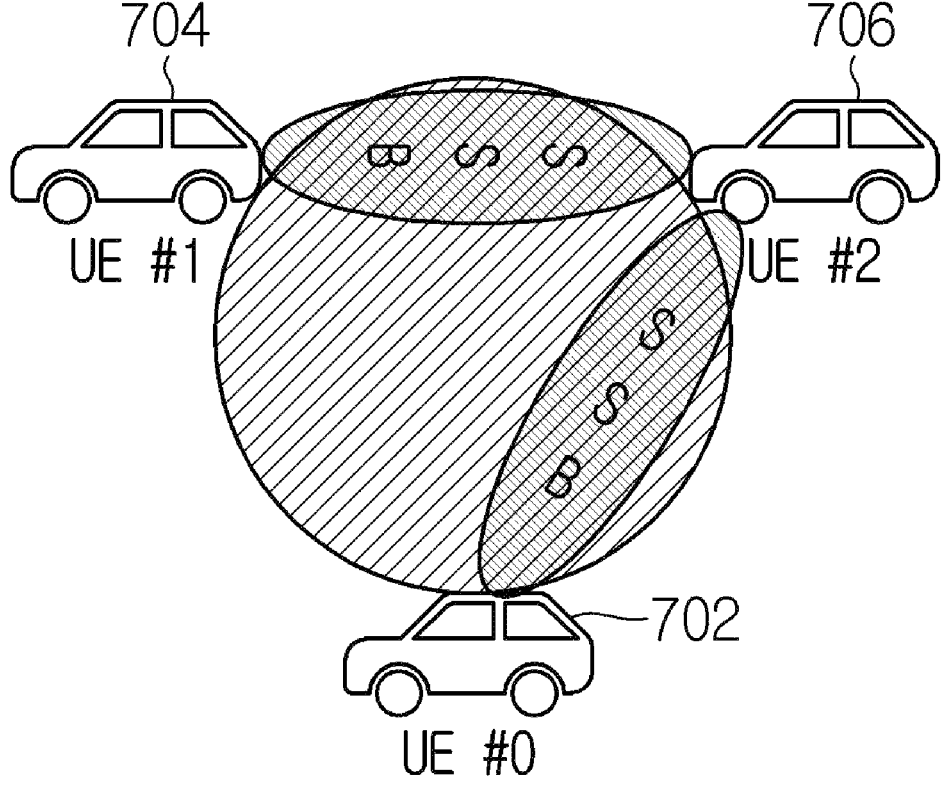
Figure 7B:
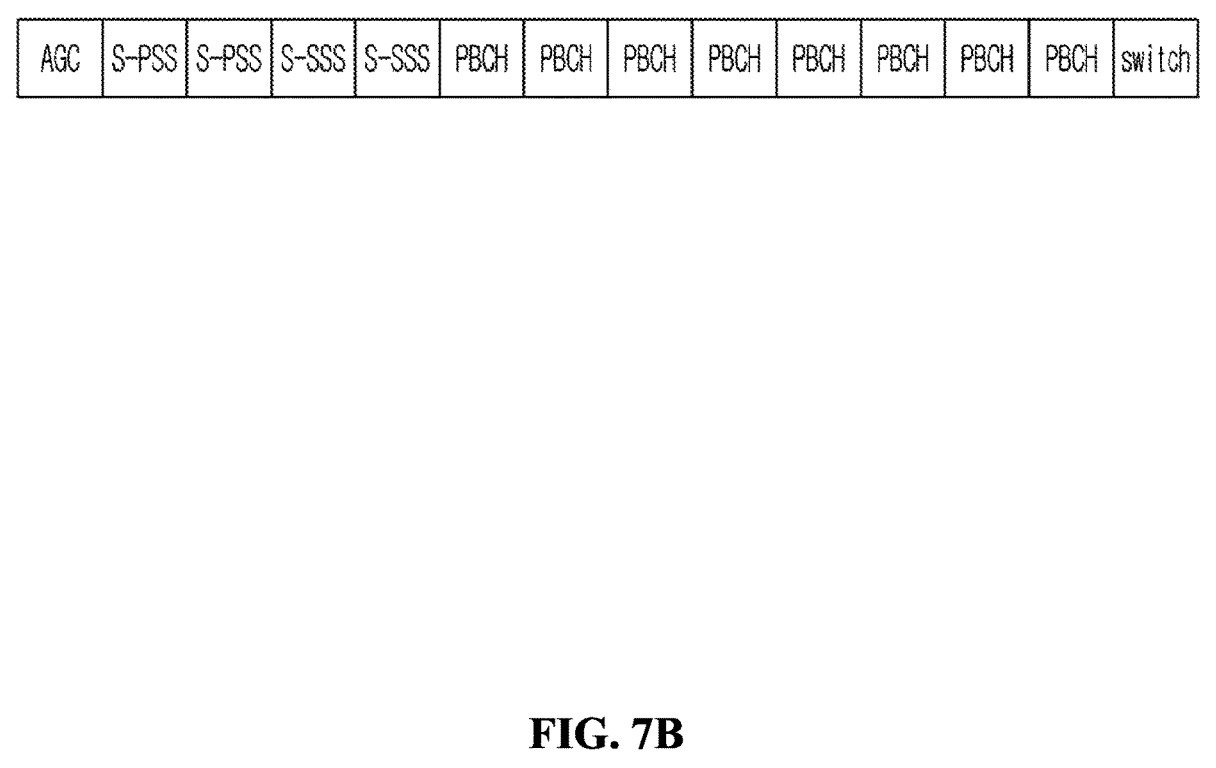
Figure 7C:
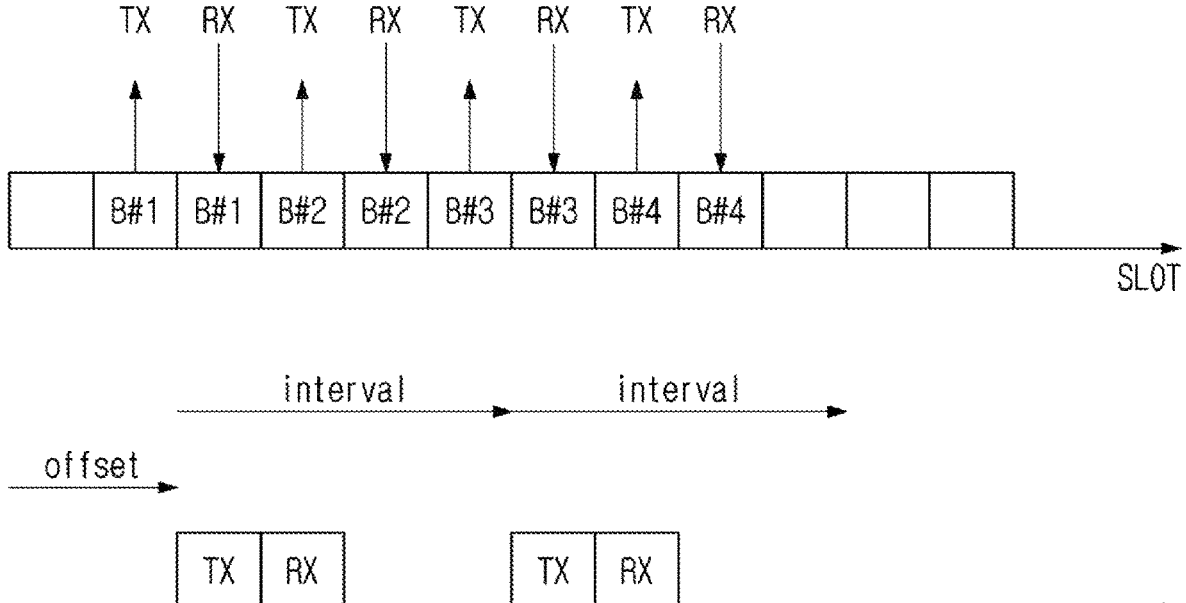

FIGS. 7A to 7C are diagrams related to an operation of a terminal (UE) applicable to the present disclosure. Referring to FIG. 7A, UE #0 702 and UE #1 704 transmit SSBs, and UE #2 706 receives SSBs. UE #2 706 may receive the SSBs based on a preconfigured SSB period. In the case of V2X, the SSB may be located at a center frequency in a channel raster. The SSB may use one slot as shown in FIG. 7B. The period of the SSB may be 160 ms, and a repetition pattern may vary according to numerology. For example, repetition according to numerology is as follows.

KHz={1}, 30 kHz={1,2}, 60 kHz={1,2,4} for FR1
KHz={1, . . . , 32}, 120 kHz={1, . . . , 64} for FR2

The terminal may determine an SSB transmission pattern based on a RRC parameter. For example, the terminal may determine the SSB repetition pattern through timeOffsetSSB-SL and timeIntervalSSB-SL.

FIG. 7C is a diagram illustrating an example of a transmission/reception pattern applicable to the present disclosure. A terminal, which has transmitted an SSB, may provide a reception terminal with a slot for receiving a response message from the reception terminal. This is because a transmission terminal needs to know resource pool information provided by the reception terminal. A pattern may be defined as follows: The terminal may maintain the existing offset, and an interval may limit TX&RX 2 slots to a minimum interval time in the existing Tx 1 slot.

Figure 8:
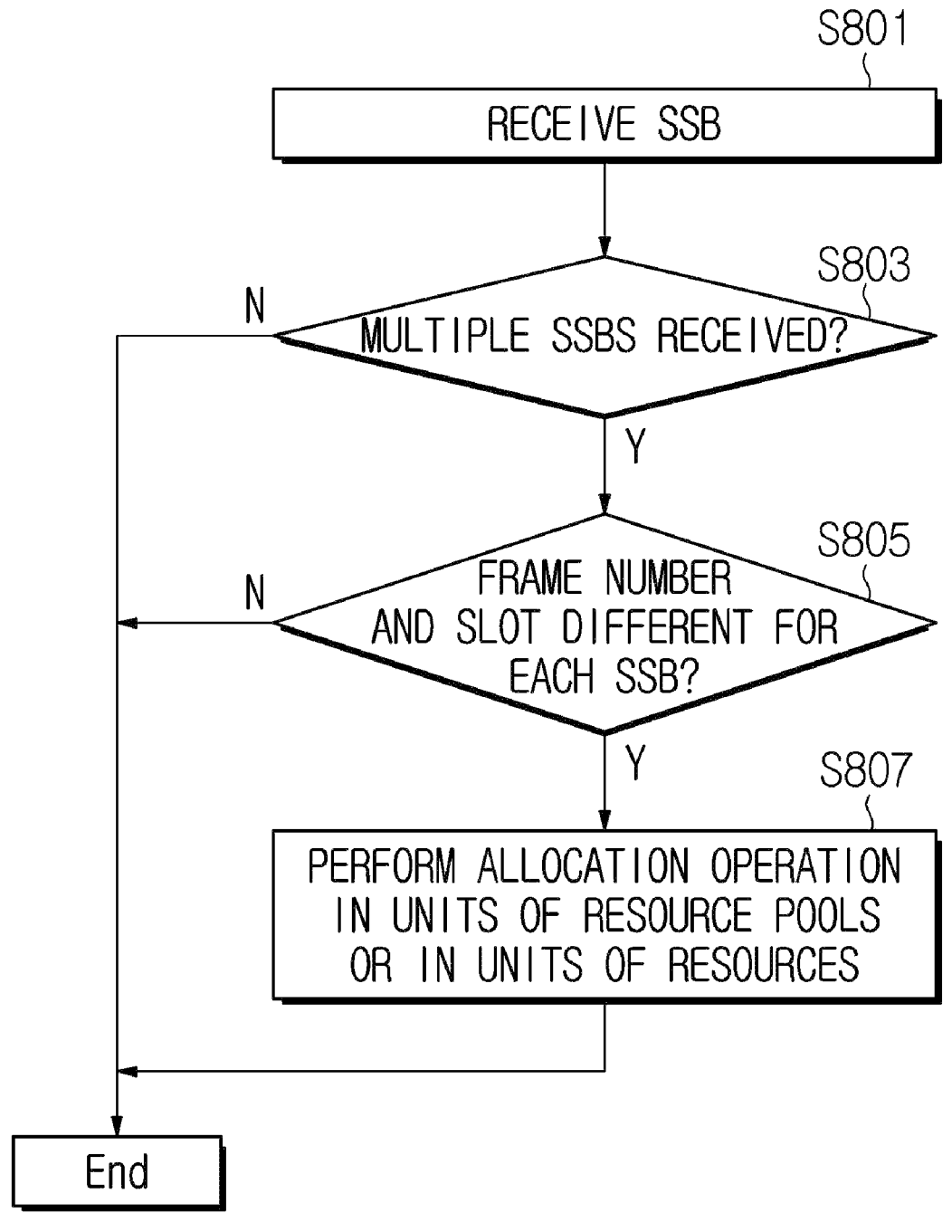
FIG. 8 is a diagram illustrating an example of an operation procedure of a terminal applicable to the present disclosure.

FIG. 8 is a diagram illustrating an example of an operation procedure of a terminal applicable to the present disclosure. In step S801, a terminal (UE) may receive an SSB. In V2X, a reception terminal may receive a plurality of SSBs from a plurality of transmission terminals. In step S803, the reception terminal may receive a plurality of SSBs. As described above with reference to FIGS. 6 and 7, terminals, which have transmitted a plurality of SSBs received by the reception terminal, may have different synchronization references. In step S805, the terminal may determine a frame number and slot of each SSB. For example, UE #2 706 may update slot and frame information by decoding each SSB and PBCH received from UE #0 702 and UE #1 704. Table 3 below shows an example of an updated table according to the above-described example.

TABLE 3

| Receive beam number | frame | slot |
| --- | --- | --- |
| SSB 1 (UE0 transmission) | 1 | 3 |
| SSB 1 (UE1 transmission) | 1 | 4 |

In step S807, the reception terminal may perform an allocation operation in units of resource pools or units of resources. As described above, the reception terminal may determine the frame number and slot of each SSB. When the slots indicate the same value, the reception terminal may allocate a resource pool based on a PBCH. For example, the reception terminal may determine a transmission type or content type included in the PBCH of the transmission terminals, and allocate a resource pool so that a service with higher priority uses more resources.

If the slots indicate different values, the reception terminal may allocate a resource pool based on a PBCH. Also, the reception terminal may set a synchronization reference to a specific slot based on the allocated resource pool. For example, the reception terminal determines the transmission type or content type included in the PBCH of the transmission terminals, and allocate a resource pool so that a service with higher priority uses more resources. In addition, the reception terminal may set a synchronization reference to a slot with a small resource pool. In addition, the reception terminal may configure another slot based on the slot to which the synchronization reference is set. For example, assuming that the resource pool of UE #0 702 is 1 and the resource pool of UE #1 704 is 2, the timing of data received in Resource pool 1 may be synchronized with a synchronization time based on Slot 3. In addition, a slot value of data received in Resource pool 2 may be determined based on an equation of Slot 3+(reception slot mod 10).

The reception terminal may transmit configured resource pool information to the terminal, which has transmitted the SSB, in the form of a response message. The response message may include reserve symbol information and reserve subchannel information. As an example, the content of the response message are as follows.

Resource Pool Allocation Message
{Reserve Symbol Info
Reserve Sub Channel Info}
The reception terminal may transmit a response message based on a beam whose SSB is aligned in a direction of a received beam. The reception terminal may transmit a response message in a next slot of the reception slot.

Figure 9:
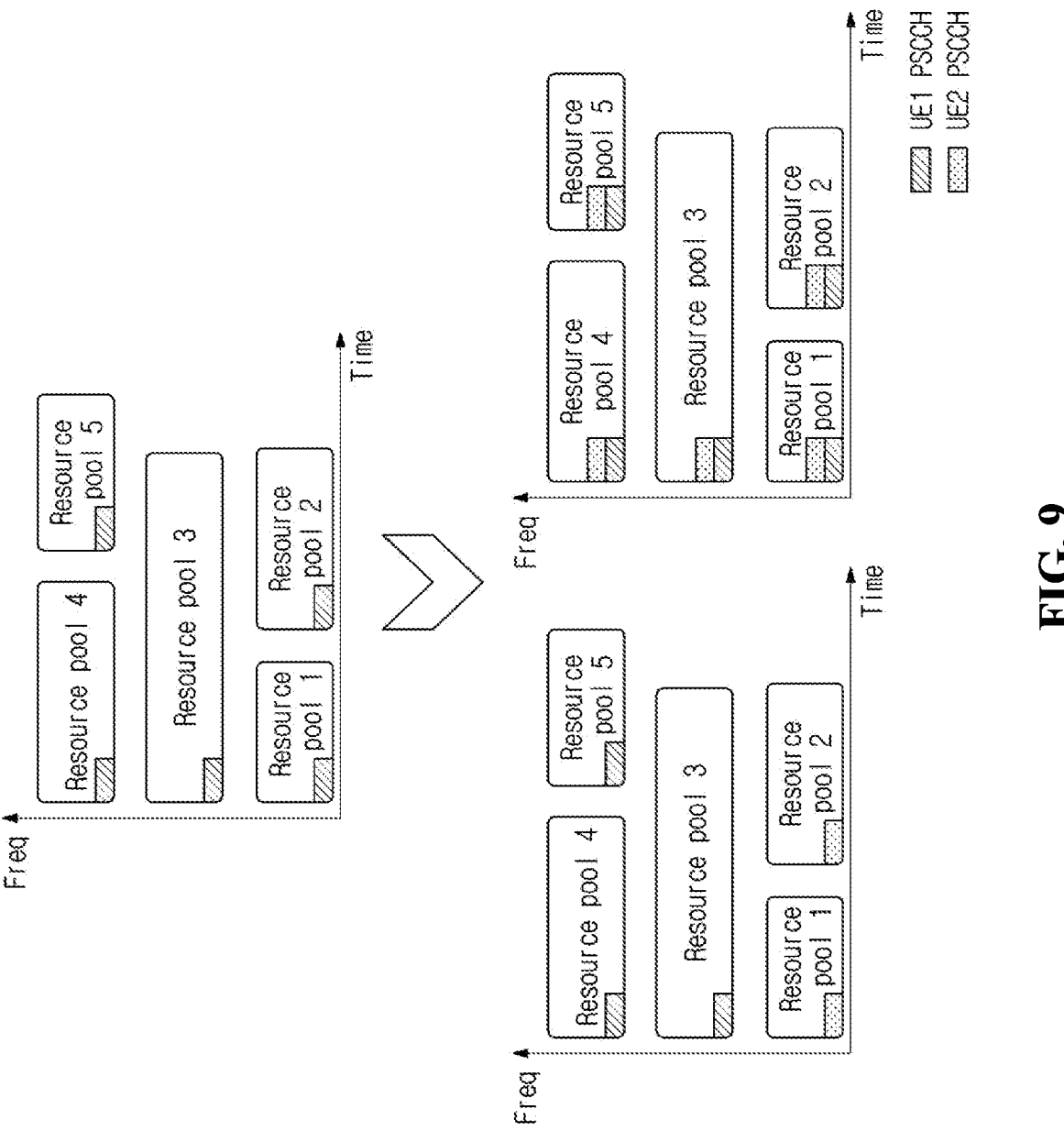
FIG. 9 is a diagram illustrating examples of resource pool allocation applicable to the present disclosure.

FIG. 9 is a diagram illustrating examples of resource pool allocation applicable to the present disclosure.

For example, a reception terminal (UE) may allocate an independent resource pool to each terminal. Referring to FIG. 9(A), the reception terminal may allocate independent spaces in Resource pool 1 and Resource pool 2 to UE2, and allocate independent spaces in Resource pool 3, Resource pool 4, and Resource pool 5 to UE1.

As another example, the reception terminal may allocate an independent space in a resource to each terminal. Referring to FIG. 9(B), the reception terminal may allocate independent spaces in Resource pool 1, Resource pool 2, Resource pool 3, Resource pool 4, and Resource pool 5 to UE1 and UE2, respectively.

A response message including resource pool information may be transmitted in the form of a physical sidelink control channel (PSCCH). Accordingly, response message transmission may be more reliable. When the terminal transmits the response message, the value of a scramble ID may be mapped to an SLSS ID and transmitted. Accordingly, the terminal, which has received the response message, may determine whether it is its own message. This operation may be a single operation. When transmitting a PSCCH, the terminal may scramble it with 1010. The terminal, which has received the response message, may transmit data based on the content of the message.

Hereinafter, a method of selecting a resource pool by a reception terminal applicable to the present disclosure will be described.

ALT 1. The terminal may allocate resources based on neighboring beams. Specifically, the terminal may allocate resources based on the resource allocation form of the neighboring beams. For example, if Beam 1, Beam 2, and Beam 3 are adjacent to each other and Beam 1 and Beam 3 use Resource pool 1 and Resource pool 2, the terminal may select resources other than Resource pool 1 and Resource pool 2 for Beam 2.

ALT 2. The terminal may allocate resources based on a PBCH. Specifically, the terminal may allocate resources based on a transmission type included in the PBCH. For example, the terminal may allocate different resource pools according to unicast, groupcast, and broadcast. In addition, the terminal may divide and allocate subchannels and symbols in the resource pool according to unicast, groupcast, and broadcast. As another example, the terminal may allocate a resource pool based on a service type or divide and allocate subchannels and symbols in the resource pool.

Meanwhile, the reception terminal may allocate a resource pool so as to provide feedback to a plurality of terminals at the same time. Specifically, the reception terminal may set the feedback period of the resource pool based on the slot. For example, assuming that the slot number of UE1=2 and the slot number of UE2=3, the reception terminal may allocate a resource pool having a feedback period of UE2=3 to UE2 and allocate a resource pool having a feedback period of UE1=4 to UE1.

Figure 10:
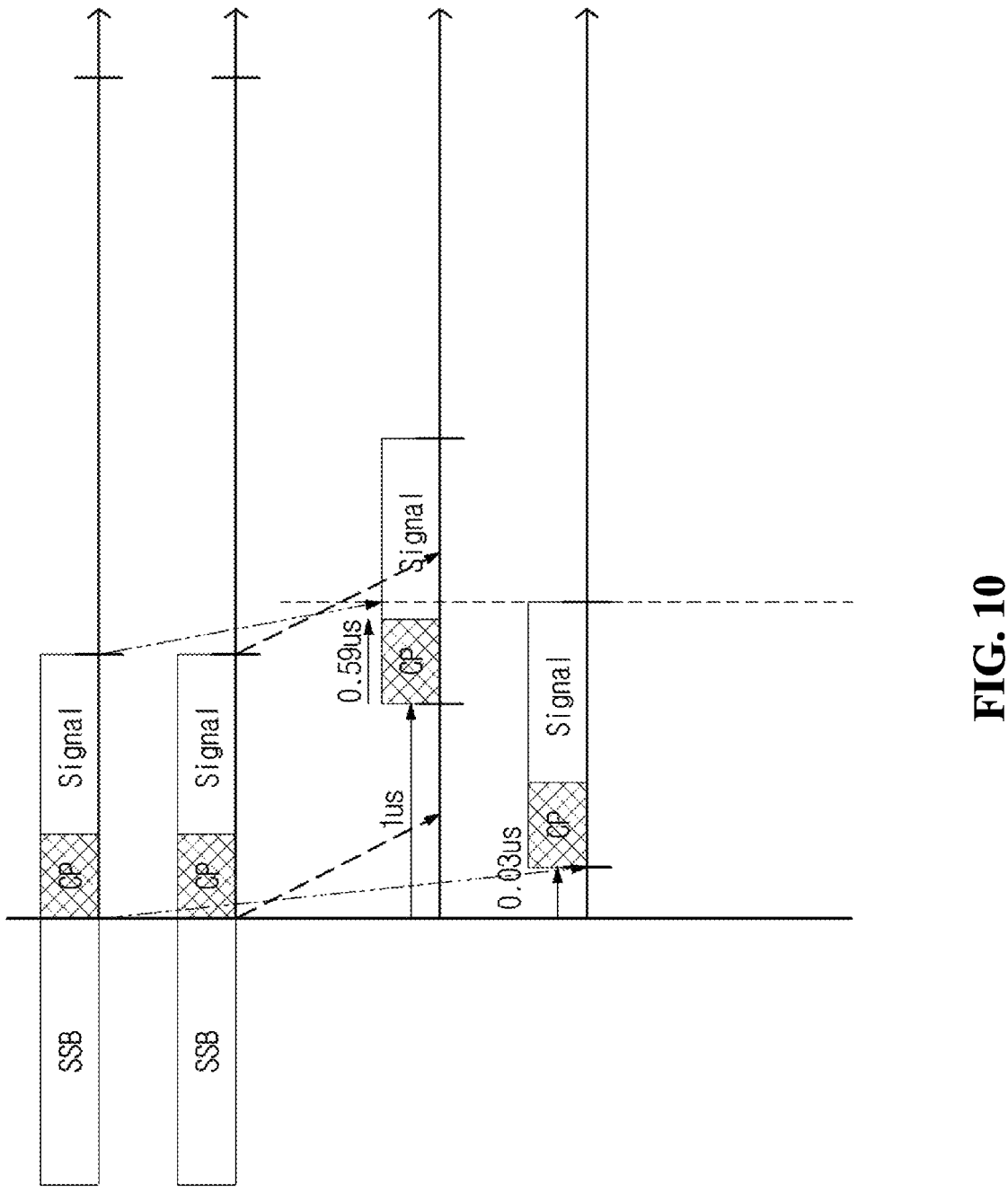
FIG. 10 is a diagram illustrating an example of a terminal operation for receiving a plurality of SSBs.

FIG. 10 is a diagram illustrating an example of a terminal operation for receiving a plurality of SSBs. Referring to FIG. 10, two transmission terminals transmit SSBs. A reception terminal may receive data by performing time synchronization with an SSB having the highest priority among the received SSBs. The reception terminal may fail to decode data transmitted from a terminal other than the terminal which has performed time synchronization. Also, in this case, there may be an interference effect.

Meanwhile, a transmission terminal may obtain propagation delay from a plurality of reception terminals. The transmission terminal may calculate a cyclic prefix (CP) length and a subcarrier spacing (SCS) of each reception terminal and inform the reception terminal of the same. The transmission terminal does not notify the reception terminal of the CP length and the SCS and the reception terminal may perform a plurality of fast Fourier transform (FFT) operations. This method may have high computational complexity. In a terminal-to-terminal communication environment, a terminal cannot measure propagation delay. That is, in an environment without a base station, a terminal cannot measure propagation delay. In addition, since the terminal does not know when to receive data, the terminal performing a plurality of FFTs increases complexity. This disclosure proposes a method in which a terminal groups SSBs included in the same CP length and simultaneously decodes SSBs not included in the same CP length by applying different timings.

Figure 11A:
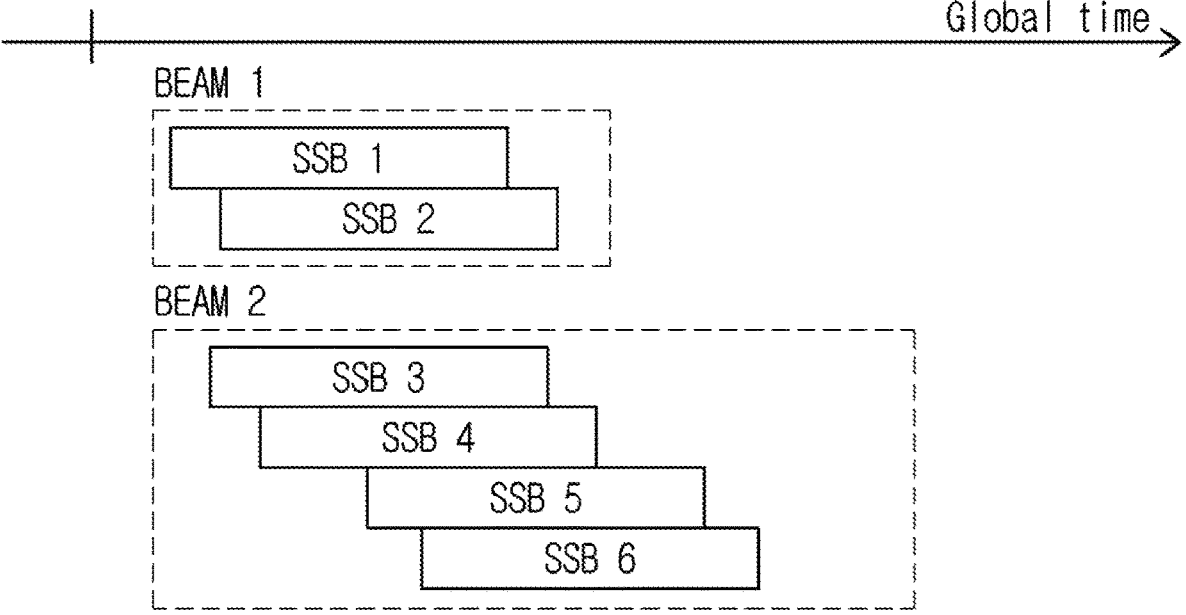
FIGS. 11A and 11B are diagrams illustrating an example of SSB grouping applicable to the present disclosure.
Figure 11B:
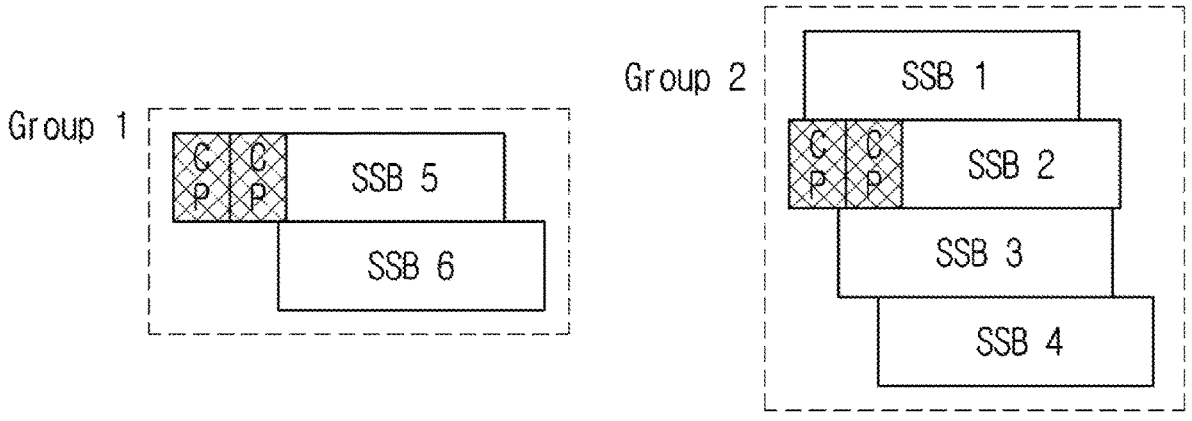

FIGS. 11A and 11B are diagrams illustrating an example of SSB grouping applicable to the present disclosure. When receiving multiple SSBs, a terminal may select one SSB. An SSB group may be defined as a set of SSBs located within a CP boundary based on the selected SSB. Referring to FIG. 11A, the terminal may receive SSB 1 and SSB 2 in Beam 1. In addition, the terminal may receive SSB 3, SSB 4, SSB 5, and SSB 6 in Beam 2. The terminal has received all of SSB 1 to SSB 6 at different timings, and knows all of the respective reception timings. RSRP and reference of SSB 1 to SSB 6 are shown in Table 4 below.

TABLE 4

| SSB number | SSB RSRP | SSB reference |
|---|---|---|
| SSB 1 | 20 | GNSS |
| SSB 2 | 30 | gNB |
| SSB 3 | 10 | GNSS |
| SSB 4 | 40 | GNSS |
| SSB 5 | 60 | gNB |
| SSB 6 | 50 | gNB |

Referring to FIG. 11B, a terminal may perform grouping of two SSBs for SSBs 1 to 6. Hereinafter, an SSB grouping procedure will be described. The terminal may select an SSB based on an SSB reference and SSB RSRP. For example, in the table above, the terminal may select SSB 5 based on the SSB reference and SSB RSRP. Accordingly, SSB 5 may be a first reference synchronization signal. The terminal may group SSBs within the CP boundary based on the selected SSB 5. For example, the terminal may group SSB 5 and SSB6 within the CP boundary based on SSB5. In addition, the terminal may select an SSB based on priority from among the remaining SSBs excluding the grouped SSBs. For example, the terminal may select SSB 2 from among SSB 1, SSB 2, SSB 3, and SSB 4 except for SSB 5 and SSB 6. The terminal may group SSB 1, SSB2, SSB 3, and SSB 4 located within the CP boundary based on SSB 2. The terminal may select the SSB by measuring channel quality, and is not limited to the above-described embodiment.

The terminal may measure channel quality based on the following factors. The terminal may measure channel quality based on reference signal received power (RSRP). RSRP may indicate average received power of all resource elements (REs) carrying a cell-specific reference signal (CRS) transmitted over the entire band. Instead of CRS, average received power of all REs carrying Channel State Information (CSI)-Reference Signal (RS) may be measured, and is not limited to the above-described embodiment. The terminal may measure channel quality based on a RSSI (received signal strength indicator). The RSSI represents received power measured over the entire band. The RSSI may include all signals, interference, and thermal noise. The terminal may measure channel quality based on reference symbol received quality (RSRQ). RSRQ may mean CQI. CQI may be determined by RSRP/RSSI according to measurement bandwidth or subband. RSRQ may mean a signal-to-noise interference ratio (SINR). Since RSRP does not provide sufficient mobility information, RSRQ may be used instead of RSRP in a handover or cell reselection process. It may be calculated as RSRQ=RSSI/RSSP. The terminal may select one SSB from among a plurality of measured SSBs and attempt PBCH decoding.

Figure 12:
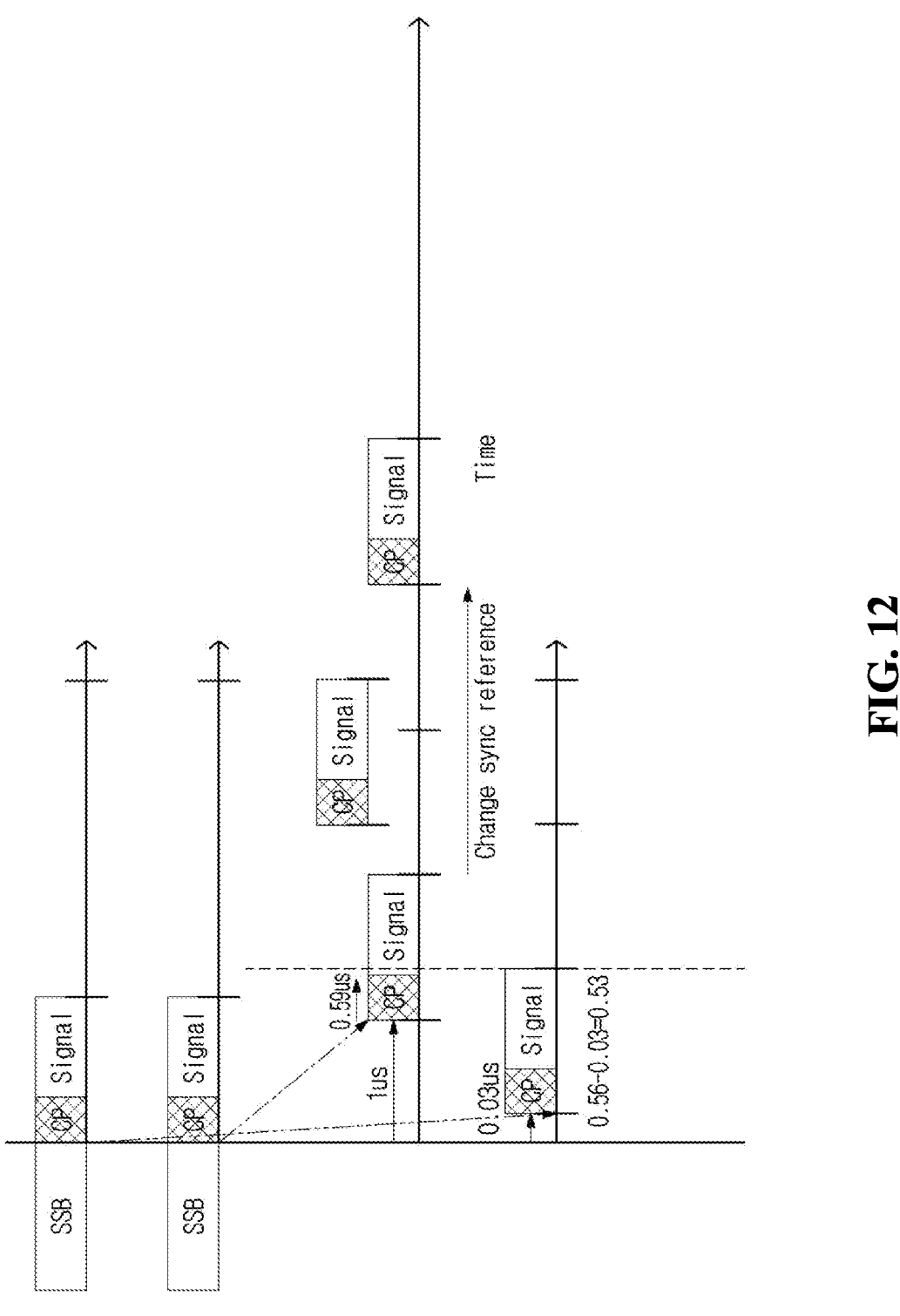
FIG. 12 is a diagram illustrating an example of a terminal operation applicable to the present disclosure.

FIG. 12 is a diagram illustrating an example of a terminal operation applicable to the present disclosure.

When performing slot configuration, the terminal may determine how many SSB groups are configured for each beam. The terminal may perform slot configuration based on the number of SSB groups of each beam. For example, referring to FIGS. 11A and 11B, Beam 1 has one SSB group and Beam 2 has two SSB groups. The terminal may receive data with only single synchronization for Beam 1 having one SSB group. A beam having a plurality of SSB groups may have a plurality of sync times. Accordingly, the terminal may allocate margin timing slots to a beam having a plurality of SSB groups. For example, the terminal may additionally allocate margin timing of 1 slot when allocating slots to Beam 2 having two SSB groups. Total slots may be expressed as follows:

$$total\ slot = total\ group\ number + 1$$

The terminal may allocate a slot for each beam based on various parameters.

ALT. 1 The terminal may allocate a slot for each beam based on the number of SSBs received or the number of SSB groups of each beam. For example, it is assumed that the terminal receives 2 SSBs in Beam 1 and receives 4 SSBs in Beam 2. In this case, four SSB transmission terminals may need to be provided with an opportunity to transmit data in Beam 2. The terminal may allocate more slots to Beam 2 in which 4 SSBs are received than to Beam 1 in which 2 SSBs are received. Therefore, the terminal may obtain more reception opportunities. For example, the terminal may allocate 5 slots to Beam 2 and allocate 2 slots to Beam 1.

ALT. 2 The terminal may allocate slots based on a PBCH. For example, the terminal may allocate slots by giving a weight for each service based on the PBCH. Specifically, parameters such as {only sync, unicast, groupcast, broadcast} may be added to a 2-bit reserved period of the PBCH. The terminal may allocate slots through user implementation such as unicast=4 slots and groupcast=2 slots. For example, when SSB 1 and SSB 2 of Beam 1 are respectively unicast and groupcast, the terminal may allocate 4 slots+2 slots=6 slots to Beam 1. In the case of broadcast, the terminal may not send an indication.

Meanwhile, the terminal, which has received SSB, may transmit the PSCCH to the terminal, which has transmitted the SSB. When scrambling the PSCCH, the terminal may scramble it with an SLSS ID instead of scrambling it with 1010. However, when transmitting a PSCCH later (e.g., SCI), the terminal may scramble it with 1010.

Figure 13:
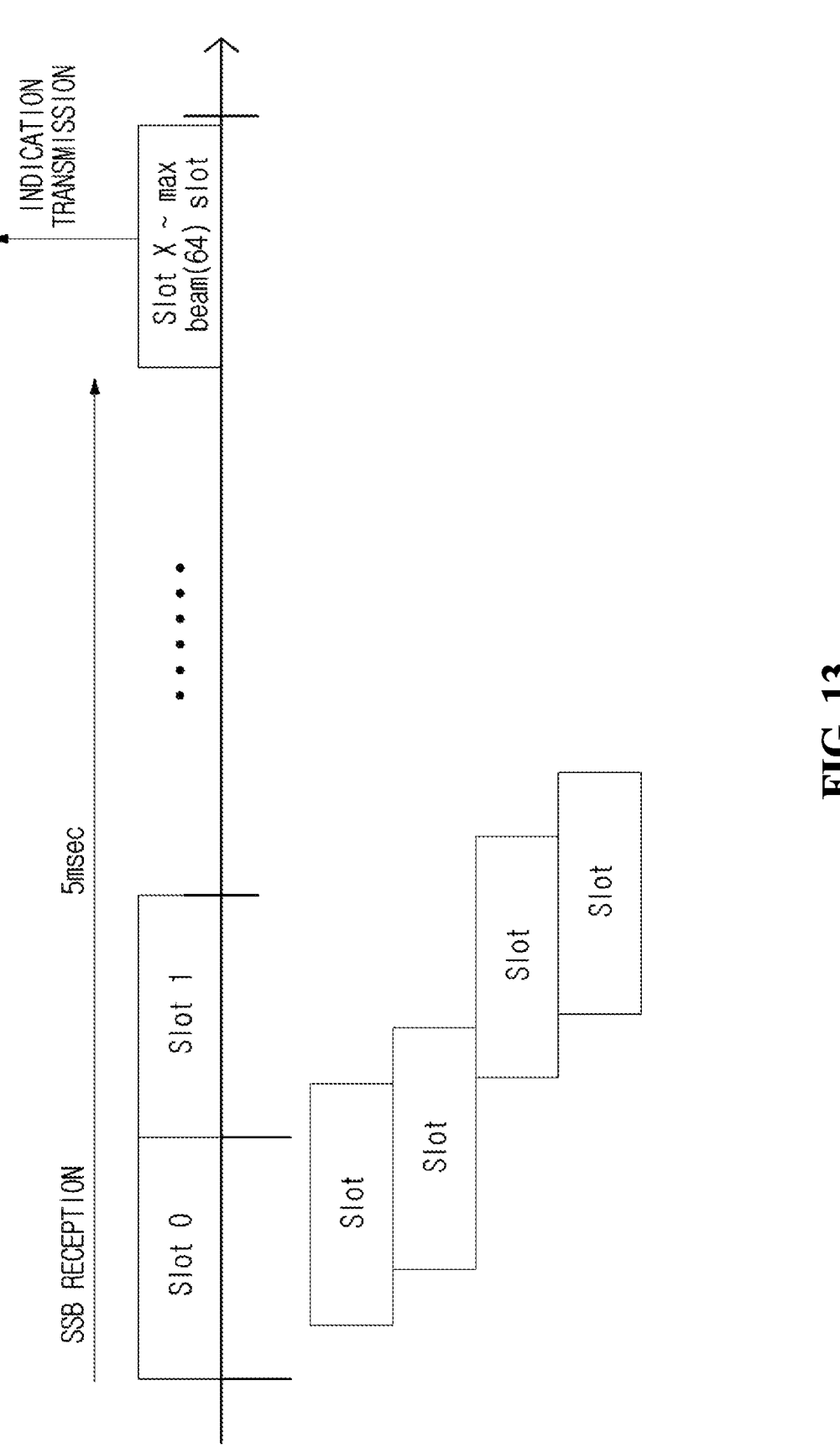
FIG. 13 is a diagram illustrating an example of a terminal operation applicable to the present disclosure.

FIG. 13 is a diagram illustrating an example of a terminal operation applicable to the present disclosure. A reception terminal may transmit information on a configured SSB group to an SSB transmission terminal. The reception terminal may transmit an SSB group information indication message to the transmission terminal based on a slot configuration determined for each SSB group. It is assumed that the number of SSB groups of Beam 1 is 1 and the number of SSB groups of Beam 2 is two. The SSB group of Beam 1 may be allocated slots {0, 1, 2}. The first SSB group of Beam 2 may be allocated slots {3, 4, 5}. The second SSB group of Beam 2 may be allocated slots {6, 7, 8}.

A period of an indication message may have a transmission period in units of slots. The period of the indication message may be set based on a slot allocated to each beam. For example, when 3 slots are allocated to Beam 1 and 6 slots are allocated to Beam 2, a period of 9 slots may be allocated to the indication message as follows.

beam 1(3 slot)+beam 2(3slot+3slot=6slot)=9 slot

If lists are present, the terminal may reflect a value obtained by adding all the lists to the period of the indication message. The following shows an example of a list.

```
List{
start slot = allocated start slot
end slot = allocated end slot
}
```

In the case of lists, the terminal may have non-contiguous TDD in relation to data transmission. Accordingly, the terminal may allocate a start slot and an end slot aperiodically so as to combine the lists. However, the lengths of the start slot and the end slot shall have continuity of slot configuration determined based on the SSB group.

Referring to FIG. 13, the terminal may transmit an indication message including SSB group information after receiving the SSB. The terminal may transmit the indication message after a time based on a processing time and a maximum beam (number of max beams) after a time period in which the SSB is received. For example, the terminal may transmit the indication message when a processing time and a time based on the number of 64 beams have elapsed after receiving the SSB for 5 msec. This operation is UE implementation. The SSB transmission terminal may expect an indication message after the reception terminal receives the SSB for 5 msec. A reception (RX) window may be 64 slots.

Figure 14:
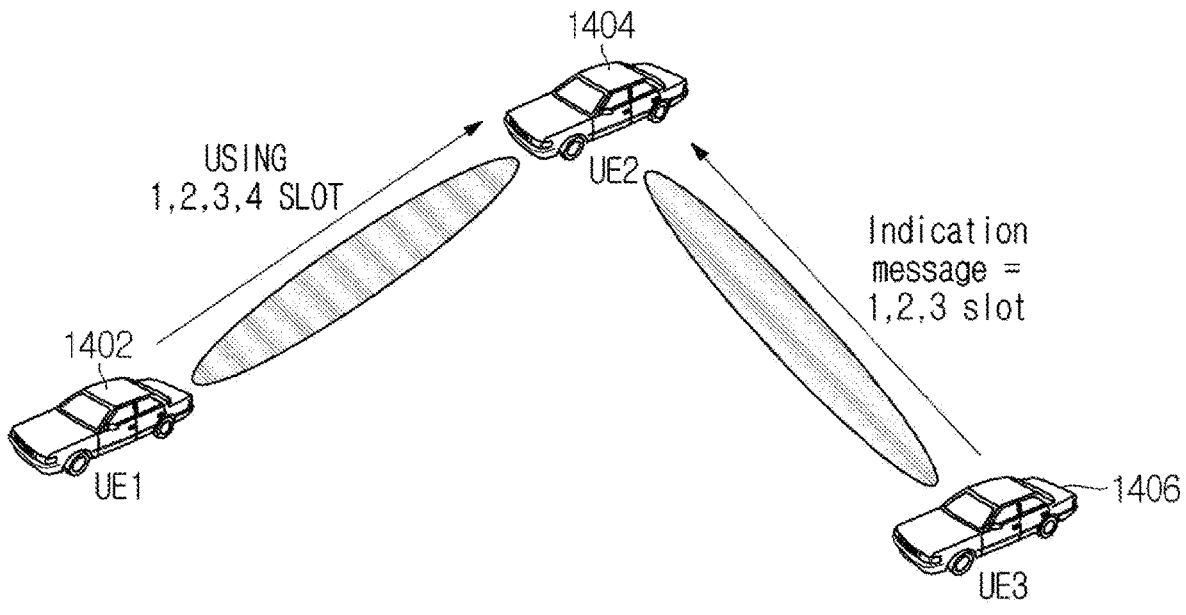
FIG. 14 is a diagram illustrating an example of a terminal operation applicable to the present disclosure.

FIG. 14 is a diagram illustrating an example of a terminal (UE) operation applicable to the present disclosure.

The SSB transmission terminal may transmit data based on a received indication message. For example, the SSB transmission terminal may determine slot timing for transmitting data based on a value included in the received indication message. The terminal may transmit data at the determined slot timing. Referring to FIG. 14, a case may occur in which a terminal needs to first receive data from another terminal at a slot timing. The transmission terminal may perform the following operations.

ALT 1. Slot Information Modification Operation

When timing to transmit data to the SSB reception terminal overlaps a slot allocated to another terminal, the SSB transmission terminal may transmit, to the other terminal, a message including information indicating that some of overlapping slots are used for the SSB reception terminal.

Referring to FIG. 14, Slot 1, Slot 2, Slot 3, and Slot 4 are allocated between UE1 1402 and UE2 1404, and an indication message transmitted from UE3 1406 to UE2 1404 may include information for allocating Slot 1, Slot 2 and Slot 3. In this case, UE2 may transmit a message including indication information indicating that some slots are used for other terminals to UE1 through a PSCCH. For example, Slot 1 and Slot 2 may be used for UE3 1406, and Slot 3 and Slot 4 may be used for UE1. UE2 may transmit a slot info change message to UE1 and UE3. Slot change message information may be expressed as follows.

```
slot info change message
{
Change slot information (start slot, end slot)
}
ALT 2. Selection of data based on priority
```

When slots allocated to transmission and reception of data between a terminal and other terminals overlap each other, the terminal may select data to be transmitted based on priority. For example, when the slots overlap, UE2 1404 may determine a slot based on the importance of data. If the data of UE1 is groupcast and the data of UE3 is unicast, UE2 may ignore a period to be received from UE1 and transmit data to UE3. UE1 may retransmit data to be transmitted in the ignored period to UE2.

Figure 15:
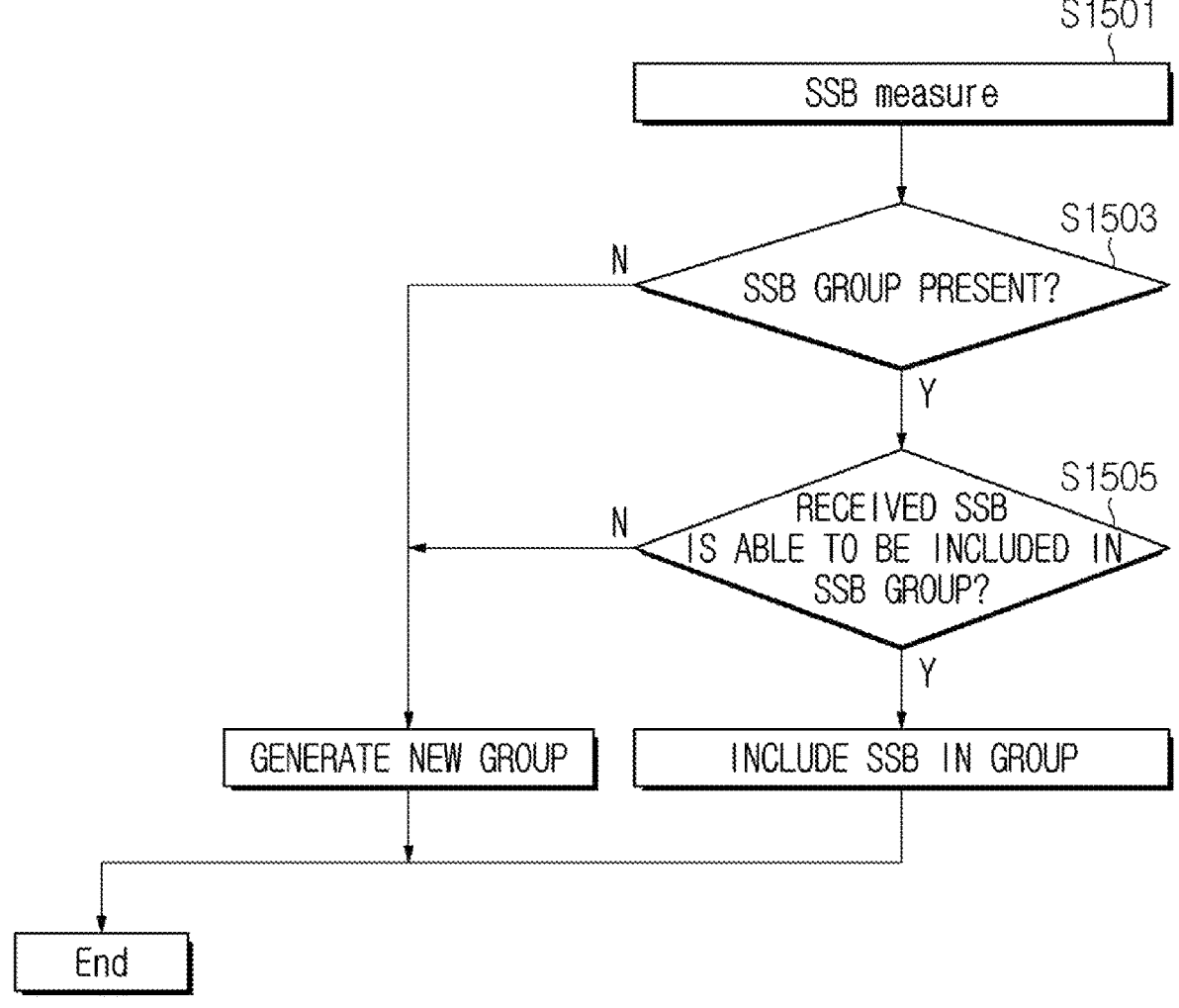
FIG. 15 is a diagram related to addition and removal of SSB groups applicable to the present disclosure.

FIG. 15 is a diagram related to addition and removal of SSB groups applicable to the present disclosure. The SSB may be repeatedly transmitted every 150 msec. Also, an SSB reception terminal may accidentally receive an SSB transmitted by another terminal. In step S1501, the terminal may receive an SSB. In step S1503, the terminal may determine whether an SSB group is formed. If there is no SSB group already formed, the terminal may generate a new SSB group. In step S1505, if there is an already formed SSB group, the terminal may determine whether the received SSB is able to be included in the group. For example, the terminal may determine whether to include the newly received SSB in the group based on the CP boundary maintained by the existing SSB group. If the newly received SSB is not able to be included in the existing group based on the CP boundary, the terminal generate a new group. Accordingly, the terminal may perform new slot configuration and transmit a slot information change message to terminals belonging to the SSB group. The terminal may periodically receive the SSB every 150 msec, but may not receive the SSB at any moment. In this case, the terminal may remove SSB group information. The SSB transmission period may vary and is not limited to the above-described embodiment.

Figure 16:
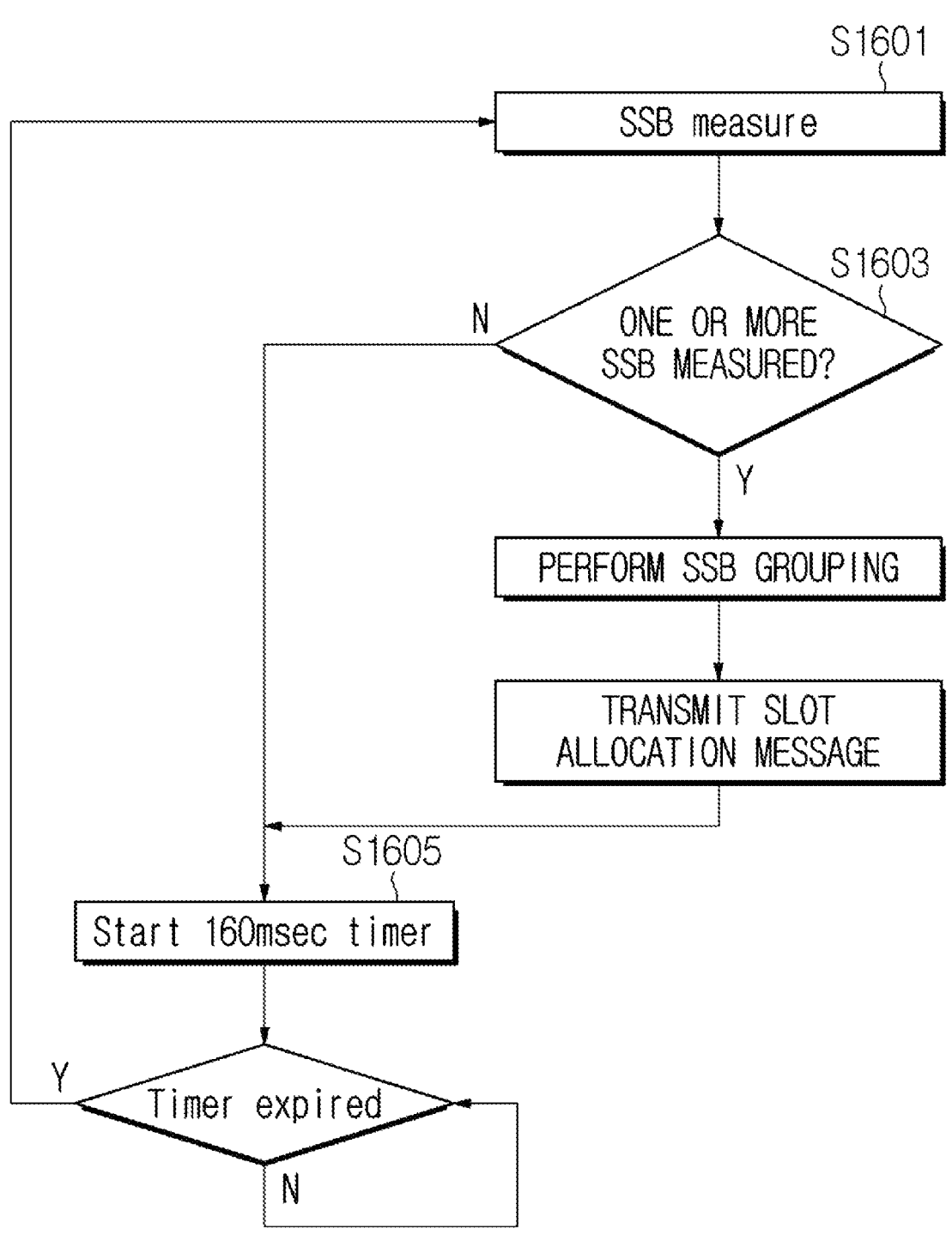
FIG. 16 is a diagram illustrating an example of a sidelink terminal operation procedure applicable to the present disclosure.

FIG. 16 is a diagram illustrating an example of a sidelink terminal operation procedure applicable to the present disclosure. In step S1601, the terminal may measure an SSB. In step S1603, the terminal may determine whether one or more SSBs have been measured. When a plurality of SSBs are measured, the terminal may perform SSB grouping. Also, the terminal may allocate a slot to each beam based on SSB grouping. The terminal may transmit a slot allocation message including allocated slot information. In step S1605, the terminal may measure the SSB every 160 msec based on a timer. The period may vary, and is not limited to the above-described embodiment.

Figure 17:
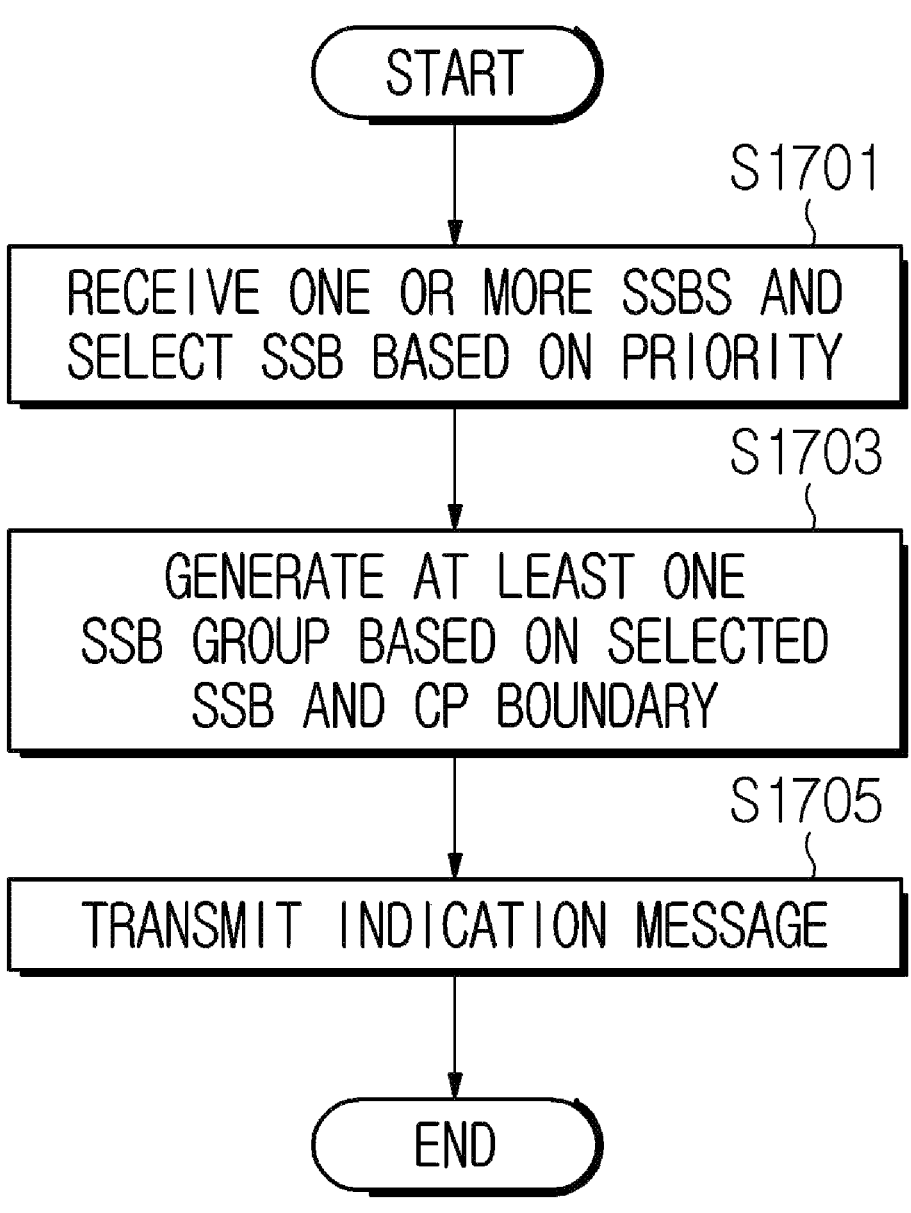
FIG. 17 is a diagram illustrating an example of a sidelink terminal operation procedure applicable to the present disclosure.

FIG. 17 is a diagram illustrating an example of a sidelink terminal operation procedure applicable to the present disclosure. In step S1701, the terminal may receive one or more SSBs and select an SSB based on priority. That is, the terminal may select the SSB based on priority from among one or more received SSBs. The priority may be based on channel measurement and synchronization reference.

In relation to an initial attach procedure, a plurality of transmission terminals may broadcast an SSB and a PBCH.

The reception terminal may receive the SSB and the PBCH, and measure channel quality based on the power of the received signal or multiple factors. The terminal may select an SSB from among a plurality of SSBs received based on channel quality measurement. The terminal may measure channel quality based on the following factors.

The terminal may measure channel quality based on reference signal received power (RSRP). RSRP may indicate average received power of all resource elements (REs) carrying a cell-specific reference signal (CRS) transmitted over the entire band. Instead of CRS, average received power of all REs carrying Channel State Information (CSI)-Reference Signal (RS) may be measured, and is not limited to the above-described embodiment. The terminal may measure channel quality based on a RSSI (received signal strength indicator). RSSI represents received power measured over the entire band. RSSI may include all signals, interference, and thermal noise. The terminal may measure channel quality based on reference symbol received quality (RSRQ). RSRQ may mean CQI. CQI may be determined by RSRP/RSSI according to measurement bandwidth or sub-band. RSRQ may mean a signal-to-noise interference ratio (SINR). Since RSRP does not provide sufficient mobility information, RSRQ may be used instead of RSRP in a handover or cell reselection process. It may be calculated as RSRQ=RSSI/RSSP. The terminal may select one SSB from among a plurality of measured SSBs and attempt PBCH decoding. Finally, a reference time may be determined based on one SSB, and data may be received in a downlink direction. In addition, the terminal may transmit HARQ to the transmission terminal.

The terminal may select the SSB based on synchronization reference. Synchronization reference may take precedence over channel quality measurement. As described above with reference to FIG. 6, the terminal may determine a reference time based on global navigation satellite system (GNSS), base station, or its own time information.

As described above with reference to FIGS. 7A to 7C, the sidelink reception terminal may receive the SSB based on a preconfigured SSB period. In the case of V2X, the SSB may be located at a center frequency in a channel raster. The period of SSB may be 160 ms, and the repetition pattern may vary according to numerology.

Meanwhile, as described above in FIG. 8, the terminal may determine the frame number and slot of each SSB. That is, the terminal may update the frame number and slot based on the received SSB and PBCH. In addition, as described above with reference to FIG. 8, the terminal may perform an allocation operation in units of resource pools or resources.

In step S1703, the terminal may generate at least one SSB group based on the selected SSB and cyclic prefix (CP) boundary. An SSB group may be defined as a set of SSBs located within a CP boundary based on the selected SSB. As described above in step S1701, when a plurality of SSBs are received, the terminal may select an SSB based on channel quality and priority of a synchronization reference. The terminal may group SSBs within the CP boundary based on the selected SSB. Also, the terminal may select an SSB from among the remaining SSBs excluding already grouped SSBs based on the above-described priority. The terminal may group SSBs within the CP boundary of the selected SSB.

The terminal may configure slots for each beam based on SSB grouping. As described above with reference to FIG. 12, when performing slot configuration, the terminal may determine how many SSB groups are configured for each beam. The terminal may perform slot configuration based on the number of SSB groups of each beam. In addition, a beam having a plurality of SSB groups may have a plurality of synchronization times. Accordingly, the terminal may allocate margin timing slots to beams having a plurality of SSB groups. For example, the terminal may additionally allocate margin timing of 1 slot when allocating slots to Beam 2 having two SSB groups.

As described above, the terminal may allocate slots to each beam based on various parameters. For example, the terminal may allocate slots to each beam based on the number of SSBs received or the number of SSB groups of each beam. As another example, the terminal may allocate slots based on the PBCH. For example, the terminal may allocate slots by giving a weight to each service based on the PBCH. Specifically, parameters such as {only sync, unicast, groupcast, broadcast} may be added to a 2-bit reserved period of the PBCH. The terminal may allocate slots through user implementation such as unicast=4 slots and groupcast=2 slots.

Meanwhile, the terminal may group terminals indicating different slot indices and allocate a resource pool that may be used only by a specific terminal. In addition, as described above with reference to FIG. 9, the reception terminal may allocate an independent resource pool to each the terminal that has transmitted the SSB. As an example, the terminal may allocate resources based on neighboring beams. Specifically, the terminal may allocate resources based on the resource allocation forms of the neighboring beams. For example, if Beam 1, Beam 2, and Beam 3 are adjacent to each other and Beam 1 and Beam 3 use Resource pool 1 and Resource pool 2, the terminal may select resources other than Resource pool 1 and Resource pool 2 for Beam 2.

As another example, the terminal may allocate resources based on the PBCH. Specifically, the terminal may allocate resources based on the transmission type included in the PBCH. For example, the terminal may allocate different resource pools according to unicast, groupcast, and broadcast. In addition, the terminal may divide and allocate subchannels and symbols in the resource pool according to unicast, groupcast, and broadcast. As another example, the terminal may allocate a resource pool based on a service type or divide and allocate subchannels and symbols in the resource pool.

Meanwhile, the reception terminal may allocate a resource pool so as to provide feedback to a plurality of terminals at the same time. Specifically, the reception terminal may set the feedback period of the resource pool based on the slot. For example, assuming that the slot number of UE1=2 and the slot number of UE2=3, the reception terminal may allocate a resource pool having a feedback period of UE2=3 to UE2 and allocate a resource pool having a feedback period of UE1=4 to UE1.

In step S1705, the terminal may transmit an indication message. Specifically, the terminal may transmit an indication message to the terminal that has transmitted the SSB. The reception terminal may transmit an SSB group information indication message to the transmission terminal based on a slot configuration determined for each SSB group. The indication message may include slot configuration information based on one or more SSB groups. Here, slots may be configured for each beam. In addition, the indication message may be transmitted through a physical sidelink control channel (PSCCH). The PSCCH may be scrambled based on a sidelink synchronization signal (SLSS) ID. The SLSS ID is based on the one or more SSBs. Specifically, the terminal may know the SLSS ID based on the primary synchronization signal (PSS) and secondary synchronization signal (SSS) of the SSB. The terminal, which has transmitted the SSB, may know that it is an indication message transmitted thereto by receiving an indication message scrambled with an SLSS ID based on the SSB transmitted thereby.

The period of the indication message may have a transmission period in units of slots. The period of the indication message may be set based on a slot allocated to each beam. For example, when 3 slots are allocated to Beam 1 and 6 slots are allocated to Beam 2, the indication message may be allocated a period of 9 slots as follows.

beam 1(3 slot)+beam 2(3slot+3slot=6slot)=9 slot

If lists are present, the terminal may reflect a value obtained by adding all the lists to the period of the indication message. The following shows an example of a list.

```
List{
start slot = allocated start slot
end slot = allocated end slot
}
```

In the case of lists, the terminal may have non-contiguous TDD in relation to data transmission. Accordingly, the terminal may allocate a start slot and an end slot aperiodically so as to combine the lists. However, the lengths of the start slot and the end slot shall have continuity of slot configuration determined based on the SSB group.

The terminal may transmit the indication message after a time based on a processing time and a maximum beam (number of max beams) after a time period in which the SSB is received. For example, the terminal may transmit the indication message when a processing time and a time based on the number of 64 beams have elapsed after receiving the SSB for 5 msec. This operation is UE implementation. The SSB transmission terminal may expect an indication message after the reception terminal receives the SSB for 5 msec. A reception (RX) window may be 64 slots.

In addition, the reception terminal may transmit configured resource pool information to the terminal, which has transmitted the SSB, in the form of a response message. The response message may mean the above-described indication message and is not limited to a specific term. The response message may include reserve symbol information and reserve subchannel information. As an example, the content of the response message are as follows.

Resource Pool Allocation Message
{Reserve Symbol Info
Reserve Sub Channel Info}

The reception terminal may transmit a response message based on a beam whose SSB is aligned in a direction of a received beam. The reception terminal may transmit a response message in a next slot of the reception slot.

Figure 18:
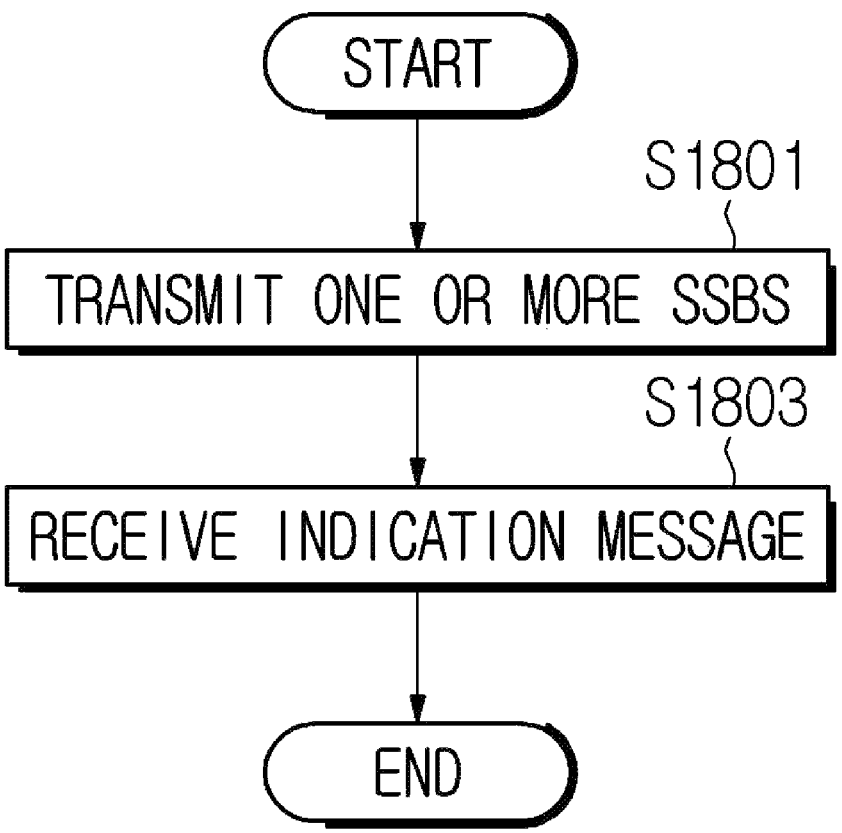
FIG. 18 is a diagram illustrating an example of a sidelink terminal operation procedure applicable to the present disclosure.

FIG. 18 is a diagram illustrating an example of a sidelink terminal operation procedure applicable to the present disclosure. In step S1801, a first terminal may transmit one or more SSBs to a second terminal. As described above, the second terminal may receive SSBs from a plurality of terminals including the first terminal. As described above, the second terminal may select an SSB based on priority. Also, the second terminal may perform SSB grouping. The second terminal may perform SSB grouping and configure slots for each beam. In addition, the second terminal may allocate a resource pool based on the SSB group. As described above, the second terminal may transmit an indication message including slot configuration and/or resource pool allocation information to the first terminal.

In step S1803, the first terminal may receive an indication message from the second terminal. The first terminal, which has transmitted the SSB, may transmit data based on the received indication message. For example, the SSB transmission terminal may determine slot timing for transmitting data based on a value included in the received indication message. The terminal may transmit data at the determined slot timing. There may be a case in which the terminal needs to first receive data from another terminal at the slot timing. The transmission terminal may perform the following operations. For example, the terminal may perform a slot information modification operation. When timing to transmit data to the SSB reception terminal based on the received indication message overlaps slots allocated to another terminal, the SSB transmission terminal may transmit, to the other terminal, a message including information indicating that some of overlapping slots are used for the SSB reception terminal. This message may be referred to as a slot info change message, and is not limited to the above-described embodiment. The slot change message information may be expressed as follows.

```
slot info change message
{
Change slot information (start slot, end slot)
}
```

As another example, the terminal may select data based on priority. When slots allocated to transmission and reception of data between a terminal and other terminals overlap each other, the terminal may select data to be transmitted based on priority.

Figure 19:
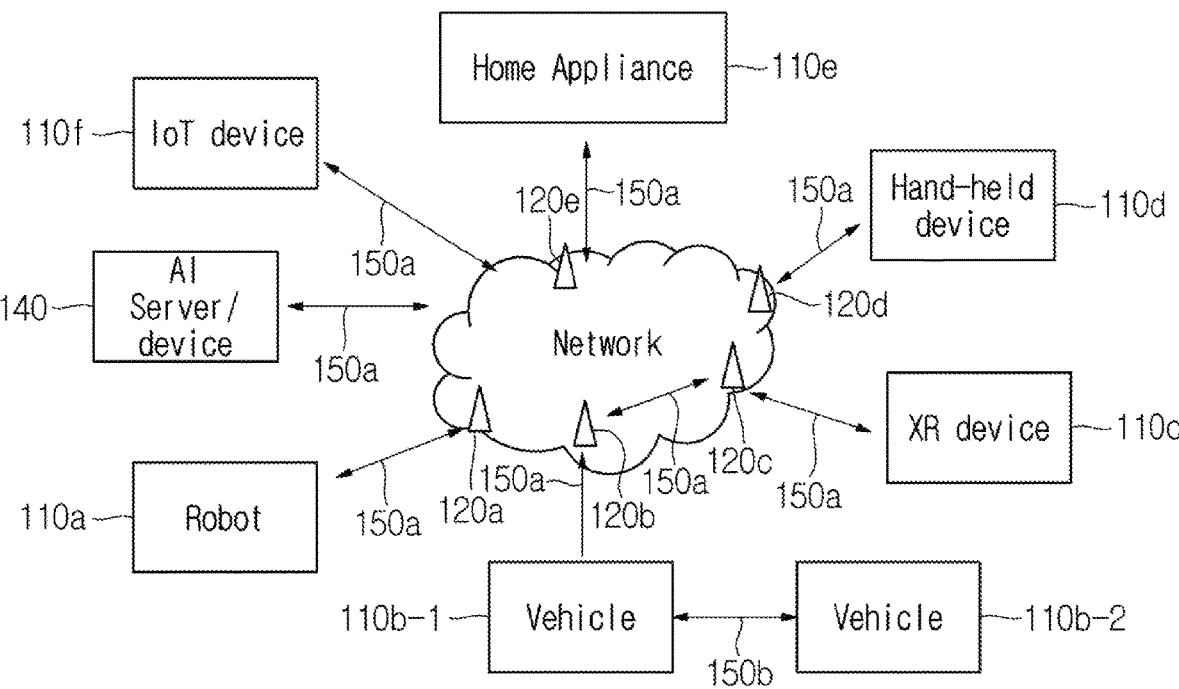
FIG. 19 illustrates an example of a communication system according to an embodiment of the present disclosure.

FIG. 19 illustrates an example of a communication system according to an embodiment of the present disclosure. An embodiment of FIG. 19 may be combined with various embodiments of the present disclosure.

Referring to FIG. 19, a communication system, which is applicable to the present disclosure, includes a wireless device, a base station, and a network. Herein, the wireless device means a device, which performs communication using a radio access technology (e.g., 5G NR, LTE), and may be referred to as communication/radio/5G device. The wireless device may include, without being limited to, at least one of a robot 110*a*, vehicles 110*b*-1 and 110*b*-2, an extended reality (XR) device 110*c*, a hand-held device 110*d*, a home appliance 110*e*, an Internet of Things (IoT) device 110*f*, and an artificial intelligence (AI) device/server 110*g*. For example, the vehicles may include a vehicle having a wireless communication function, an autonomous vehicle, and a vehicle capable of performing vehicle-to-vehicle communication. Herein, the vehicles 110*b*-1 and 110*b*-2 may include an unmanned aerial vehicle (UAV) (e.g., a drone). The XR device 110*c* may include an augmented Reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device 110*d* may include a smartphone, a smartpad, a wearable device (e.g., a smartwatch or a smartglasses), and a computer (e.g., a notebook). The home appliance 110*e* may include a TV, a refrigerator, and a washing machine. The IoT device 110*f* may include a sensor and a smartmeter. For example, the base stations 120*a* to 120*e* and the network may be implemented as wireless devices and a specific wireless device 120*a* may operate as a base station/network node with respect to other wireless devices.

Here, wireless communication technology implemented in the wireless devices 110*a* to 110*f* of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 100*a* to 100*f* of the present specification may perform communication based on the LTE-M technology. In this case, as an example, the LTE-M technology may be an example of an LPWAN technology, and may be called various names such as enhanced machine type communication (eMTC). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 100*a* to 100*f* of the present specification may include at least any one of ZigBee, Bluetooth, and Low Power Wide Area Network (LPWAN) in consideration of low power communication, without being limited to the above-described names. For example, the ZigBee technology may create PAN (personal area networks) related to small/low-power digital communication based on various standards such as IEEE 802.15.4, and may be called by various names.

The wireless devices 100*a* to 100*f* may be connected to a network via the base stations 120*a* to 120*e*. An AI technology may be applied to the wireless devices 100*a* to 100*f*, and the wireless devices 100*a* to 100*f* may be connected to the AI server 110*g* via a network. The network may be configured using a 3G network, a 4G (e.g., LTE) network, or a 5G (e.g., NR) network. Although the wireless devices 100*a* to 100*f* may communicate with each other through the base stations 120*a* to 120*e*/network, the wireless devices 100*a* to 100*f* may perform direct communication (e.g., sidelink communication) with each other without the base stations 120*a* to 120*e*/network. For example, the vehicles 110*b*-1 and 110*b*-2 may perform direct communication (e.g., Vehicle-to-Vehicle (V2V)/Vehicle-to-everything (V2X) communication). In addition, the IoT device 110*f* (e.g., a sensor) may perform direct communication with other IoT devices (e.g., sensors) or other wireless devices 101*a* to 110*f*.

Wireless communication/connections 150*a*, 150*b* and 150*c* may be established between the wireless devices 110*a* to 110*f* and the base stations 120*a* to 120*e* and between base stations 120*a* to 120*e* and the base stations 120*a* to 120*e*. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and?150*b*. For example, the wireless communication/connections 150*a* and?150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
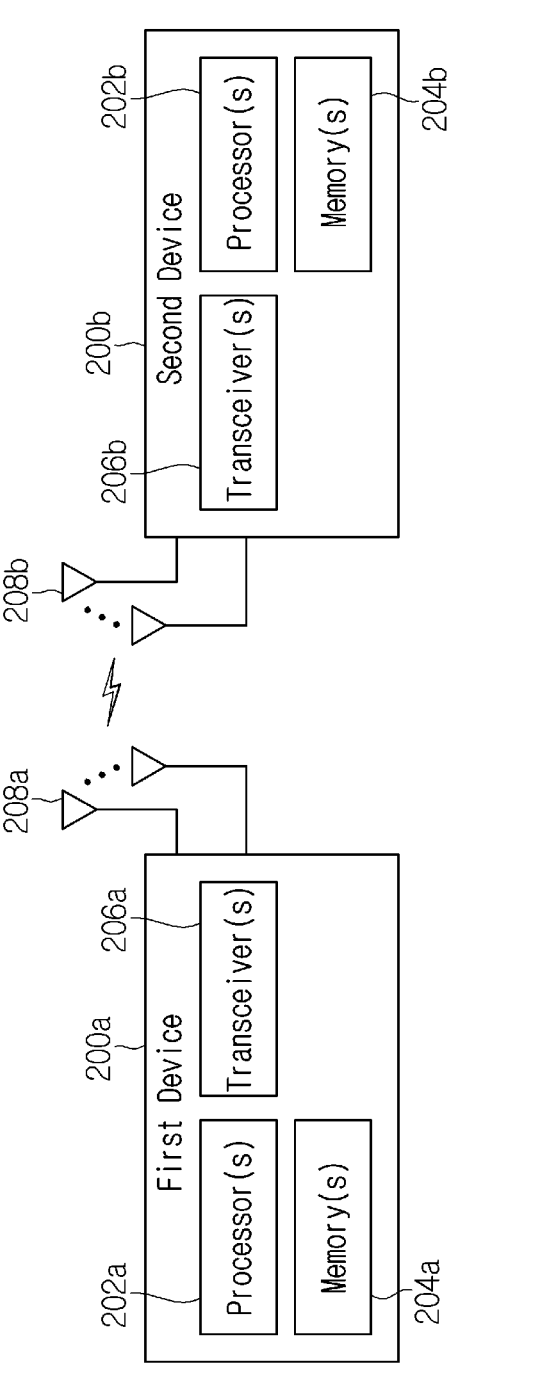
FIG. 20 illustrates an example of a wireless device according to an embodiment of the present disclosure.

FIG. 20 illustrates an example of a wireless device according to an embodiment of the present disclosure. An embodiment of FIG. 20 may be combined with various embodiments of the present disclosure.

Referring to FIG. 20, a first wireless device 200*a* and a second wireless device 200*b* may transmit and receive radio signals through various radio access technologies (e.g., LTE and NR). Herein, {the first wireless device 200*a* and the second wireless device 200*b*} may correspond to {the wireless device 110*x* and the base station 120*x*} and/or {the wireless device 110*x* and the wireless device 110*x*} of FIG. 19.

The first wireless device 200*a* may include one or more processors 202*a* and one or more memories 204*a* and additionally further include one or more transceivers 206*a* and/or one or more antennas 208*a*. The processor(s) 202*a* may control the memory(s) 204*a* and/or the transceiver(s) 206*a* and may be configured to implement the descriptions, functions, procedures, proposals, methods, and/or operational flowcharts disclosed in this document. For example, the processor(s) 202*a* may process information within the memory(s) 204*a* to generate first information/signals and then transmit radio signals including the first information/signals through the transceiver(s) 206*a*. In addition, the processor(s) 202*a* may receive radio signals including second information/signals through the transceiver 206*a* and then store information obtained by processing the second information/signals in the memory(s) 204*a*. The memory(s) 204*a* may be connected to the processor(s) 202*a* and may store various information related to operations of the processor(s) 202*a*. For example, the memory(s) 204*a* may store software code including commands for performing a part or the entirety of processes controlled by the processor(s) 202*a* or for performing the descriptions, functions, procedures, proposals, methods, and/or operational flowcharts disclosed in this document. Herein, the processor(s) 202*a* and the memory(s) 204*a* may be a part of a communication modem/circuit/chip designed to implement RAT (e.g., LTE or NR). The transceiver(s) 206*a* may be connected to the processor(s) 202*a* and transmit and/or receive radio signals through one or more antennas 208*a*. Each of the transceiver(s) 206*a* may include a transmitter and/or a receiver. The transceiver(s) 206*a* may be used interchangeably with a radio frequency (RF) unit. In the present disclosure, the wireless device may represent a communication modem/circuit/chip.

For example, the first wireless device may refer to the aforementioned terminal. Specifically, the first wireless device may include a transceiver and a processor connected to the transceiver. The processor may control the transceiver to receive one or more synchronization signal blocks (SSBs). The processor may control the first wireless device to select an SSB from among the one or more SSBs based on priority. The processor may perform control to generate at least one SSB group based on the selected SSB and cyclic prefix (CP) boundary. The processor may control the transceiver to transmit an indication message. The priority may be based on channel measurement and sync reference. The indication message may include slot configuration information based on the at least one SSB group. The slot configuration may be performed for each beam.

As another example, the first wireless device may refer to the aforementioned first terminal. Specifically, the first wireless device may include a transceiver and a processor connected to the transceiver. The processor may control the transceiver to transmit one or more synchronization signal blocks (SSBs) to the second terminal. The processor may control the transceiver to receive an indication message from the second terminal. The indication message may include slot configuration information based on at least one SSB group. The slot configuration may be performed for each beam. The at least one SSB group may be generated based on the SSB selected by the second terminal and a cyclic prefix (CP) boundary. The SSB selected by the second terminal may be selected from among one or more SSBs received by the second terminal based on priority. The priority may be based on channel measurement and sync reference.

As another example, the first wireless device may refer to an apparatus including at least one memory and at least one processor functionally connected to the at least one memory. Here, the at least one processor may control the first wireless device to receive one or more synchronization signal blocks (SSBs). The at least one processor may control the first wireless device to select an SSB from among the one or more SSBs based on priority. The at least one processor may control the first wireless device to generate at least one SSB group based on the selected SSB and a cyclic prefix (CP) boundary. The at least one processor may control the first wireless device to transmit an indication message. The priority may be based on channel measurement and synchronization reference. The indication message may include slot configuration information based on the at least one SSB group. The slot configuration may be performed for each beam.

The second wireless device 200b performs wireless communication with the first wireless device 200a, and includes one or more processors 202b and one or more memories 204b and may additionally include one or more transceivers 206b and/or one or more antennas 208b. The functions of the one or more processors 202b, one or more memories 204b, one or more transceivers 206b, and/or one or more antennas 208b are similar to the one or more processors 202a, one or more memories 204a, one or more transceivers 206a and/or one or more antennas 208a of the first wireless device 200a.

Hereinafter, hardware elements of the wireless devices 200a and 200b will be described more specifically. One or more protocol layers may be implemented by, without being limited to, the one or more processors 202a and 202b. For example, the one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), a message, control information, data or information according to the descriptions, functions, procedures, proposals, methods, and/or operational flowcharts disclosed in this document. The one or more processors 202a and 202b may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 206a and 206b. The one or more processors 202a and 202b may receive the signals (e.g., baseband signals) from the one or more transceivers 206a and 206b and acquire the PDUs, SDUs, messages, control information, data, or information according to the descriptions, functions, procedures, proposals, methods, and/or operational flowcharts disclosed in this document.

The one or more processors 202a and 202b may be referred to as controllers, microcontrollers, microprocessors, or microcomputers. The one or more processors 202a and 202b may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 202a and 202b. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 202a and 202b or stored in the one or more memories 204a and 204b so as to be driven by the one or more processors 202a and 202b. The descriptions, functions, procedures, proposals, methods, and/or operational flowcharts disclosed in this document may be implemented using firmware or software in the form of code, commands, and/or a set of commands.

For example, the first wireless device may refer to a non-transitory computer-readable medium storing at least one instruction. A computer-readable medium may include the at least one instruction executable by a processor. The at least one instruction may instruct the computer-readable medium to receive one or more synchronization signal blocks (SSBs). The at least one instruction may instruct the computer-readable medium to select an SSB from among the one or more SSBs based on priority. The at least one instruction may instruct the computer-readable medium to generate at least one SSB group based on the selected SSB and a cyclic prefix (CP) boundary. The at least one instruction may instruct the computer-readable medium to transmit an indication message. The priority may be based on channel measurement and sync reference. The indication message may include slot configuration information based on the at least one SSB group. The slot configuration may be performed for each beam.

The one or more memories 204a and 204b may be connected to the one or more processors 202a and 202b and store various types of data, signals, messages, information, programs, code, instructions, and/or commands. The one or more memories 204a and 204b may be configured by a read only memory (ROM), a random access memory (RAM), an erasable programmable read only memory (EPROM), a flash memory, a hard drive, a register, a cash memory, a computer-readable storage media, and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit user data, control information, and/or radio signals/channels, mentioned in the methods and/or operational flowcharts of this document, to one or more other devices. The one or more transceivers 206a and 206b may receive user data, control information, and/or radio signals/channels, mentioned in the descriptions, functions, procedures, proposals, methods, and/or operational flowcharts disclosed in this document, from one or more other devices. In addition, the one or more transceivers 206a and 206b may be connected to the one or more antennas 208a and 208b, and the one or more transceivers 206a and 206b may be configured to transmit and receive user data, control information, and/or radio signals/channels, mentioned in the descriptions, functions, procedures, proposals, methods, and/or operational flowcharts disclosed in this document, through the one or more antennas 208a and 208b. In this document, the one or more antennas may be a plurality of physical antennas or a plurality of logical antennas (e.g., antenna ports). The one or more transceivers 206a and 206b may convert received radio signals/channels, etc., from RF band signals into baseband signals in order to process received user data, control information, radio signals/channels, etc., using the one or more processors 202a and 202b. The one or more transceivers 206a and 206b may convert the user data, control information, radio signals/channels, etc., processed using the one or more processors 202a and 202b from the base band signals into the RF band signals. To this end, the one or more transceivers 206a and 206b may include (analog) oscillators and/or filters.

Figure 21:
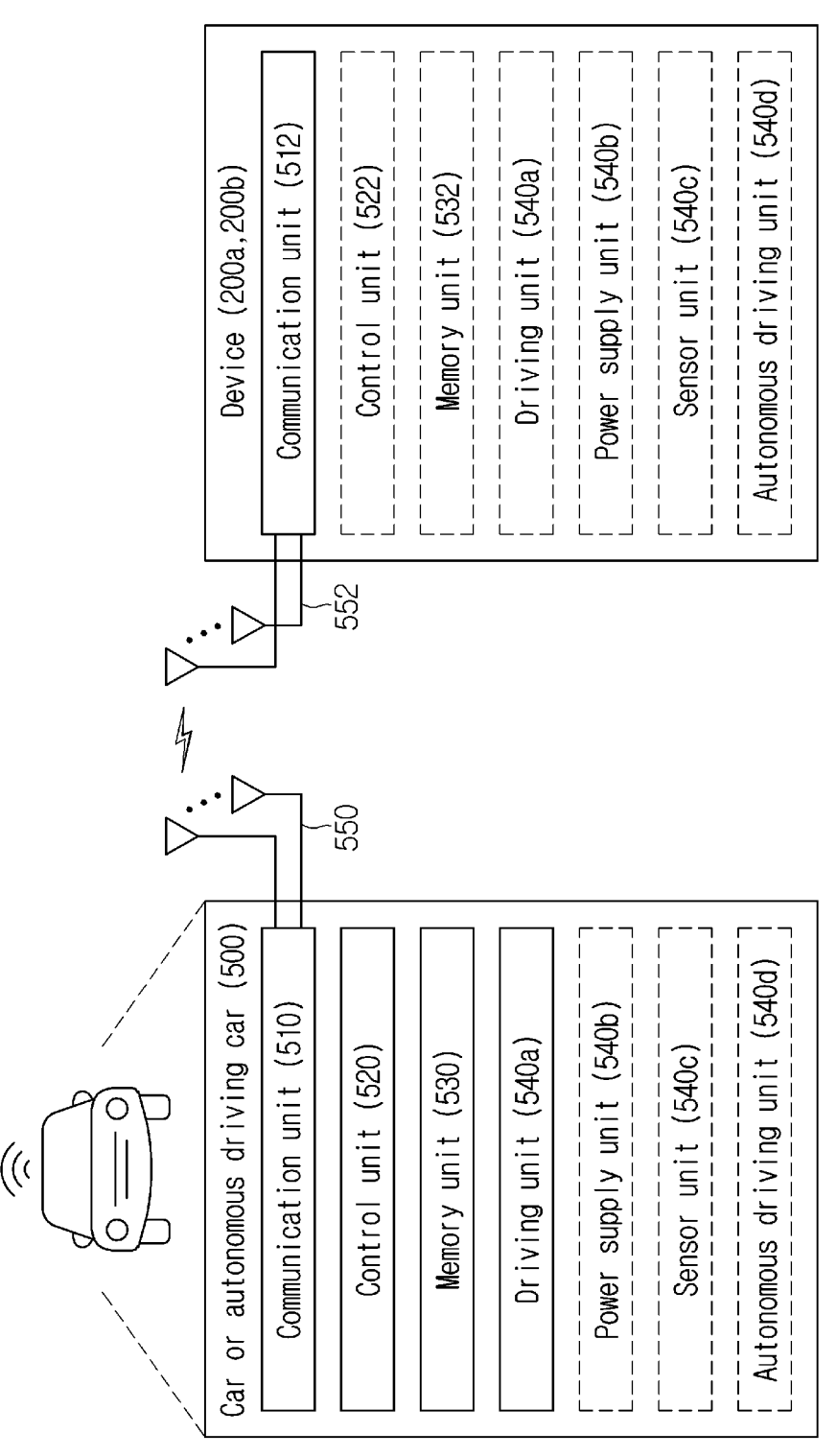
FIG. 21 illustrates an example of a vehicle or an autonomous vehicle according to an embodiment of the present disclosure.

FIG. 21 illustrates an example of a vehicle or an autonomous vehicle according to an embodiment of the present disclosure. FIG. 21 illustrates a vehicle or autonomous vehicle that is applied to the present disclosure. The vehicle or autonomous vehicle may be implemented by a mobile robot, a car, a train, a manned/unmanned aerial vehicle (AV), a ship and the like but is not limited to a vehicle form. An embodiment of FIG. 21 may be combined with various embodiments of the present disclosure.

Referring to FIG. 21, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 650 may be configured as a part of the communication unit 610.

The communication unit 610 may transmit and receive signals (e.g., data and control signals) to and from external devices such as other vehicles, base stations (e.g., base stations and road side units), and servers. The control unit 620 may perform various operations by controlling elements of the vehicle or the autonomous vehicle 100. The control unit 120 may include an electronic control unit (ECU). The driving unit 640a may cause the vehicle or autonomous vehicle 600 to drive on a road. The driving unit 640a may include an engine, a motor, a powertrain, a wheel, a brake, a steering device, etc. The power supply unit 640b may supply power to the vehicle or autonomous vehicle 600 and include a wired/wireless charging circuit, a battery, etc. The sensor unit 640c may acquire a vehicle state, ambient environment information, user information, etc. The sensor unit 640c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640d may generate an autonomous driving path and a driving plan from the obtained data. The control unit 620 may control the driving unit 640a such that the vehicle or autonomous vehicle 600 may move along the autonomous driving path according to the driving plan (e.g., speed/direction control). In the middle of autonomous driving, the communication unit 610 may aperiodically/periodically acquire recent traffic information data from the external server and acquire surrounding traffic information data from neighboring vehicles. In the middle of autonomous driving, the sensor unit 640c may obtain a vehicle state and/or surrounding environment information. The autonomous driving unit 640d may update the autonomous driving path and the driving plan based on the newly obtained data/information. The communication unit 610 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

INDUSTRIAL AVAILABILITY

The embodiments of the present disclosure are applicable to various radio access systems. Examples of the various radio access systems include a $3^{rd}$ generation partnership project (3GPP) or 3GPP2 system.

Embodiments of the present disclosure are applicable not only to the various wireless access systems but also to all technical fields utilizing the various wireless access systems. Furthermore, the proposed method may be applied to mmWave and THz Wave communication systems using very high frequency.

Additionally, embodiments of the present disclosure may be applied to various applications like autonomous cars and drones.

31

The invention claimed is:

1. A method comprising:

receiving, by a terminal, one or more synchronization signal blocks (SSBs);

selecting an SSB from among the one or more SSBs based on priority;

generating at least one SSB group based on the selected SSB and a cyclic prefix (CP) boundary, wherein each of the at least one SSB group includes a plurality of SSBs;

transmitting an information message;

receiving a sidelink synchronization signal (SLSS) and a physical broadcast channel (PBCH) based on the one or more SSBs;

receiving control information based on a physical sidelink control channel (PSCCH); and receiving data based on a physical sidelink shared channel (PSSCH), wherein the priority is based on channel measurement and synchronization reference, wherein the information message comprises slot configuration information, wherein the slot configuration is performed for each beam based on the number of the at least one SSB group, wherein a 2-bit reserved period of a physical broadcast channel (PBCH) included in the one or more SSBs comprises a cast-type related parameter, and a slot is configured for each beam based on the cast-type parameter, and wherein the terminal determines the cast-type related parameter of a broadcast type and does not transmit the information message.

2. The method of claim 1, wherein a beam received by the terminal has a plurality of SSB groups, and the terminal additionally allocates one slot to the received beam.

3. The method of claim 1, wherein the information message is transmitted through a physical sidelink control channel (PSCCH), the PSCCH is scrambled based on a sidelink synchronization signal (SLSS) ID, and the SLSS ID is based on the one or more SSBs.

4. The method of claim 1, wherein the terminal selects a resource pool based on the one or more SSBs, and the resource pool is allocated based on priority of a content type of a PBCH included in SSBs in the SSB group.

5. The method of claim 4, wherein the information message comprises reserve symbol and reserve subchannel information based on the allocated resource pool information.

6. The method of claim 4, wherein the resource pool is allocated based on resources of a beam different from a beam to which the received SSBs belong.

7. A terminal comprising:

a transceiver; and a processor connected to the transceiver, wherein the processor is configured to:

control the transceiver to receive one or more synchronization signal blocks (SSBs), control the terminal to select an SSB from among the one or more SSBs based on priority, control the terminal to generate at least one SSB group based on the selected SSB and a cyclic prefix (CP) boundary, wherein each of the at least one SSB group includes a plurality of SSBs;

control the transceiver to transmit an information message;

control the transceiver to receive a sidelink synchronization signal (SLSS) and a physical broadcast channel (PBCH) based on the one or more SSBs;

control the transceiver to receive control information based on a physical sidelink control channel (PSCCH); and control the transceiver to receive data based on a physical sidelink shared channel (PSSCH), wherein the priority is based on a channel measurement and synchronization reference, wherein the information message comprises slot configuration information, wherein the slot configuration is performed for each beam based on the number of the at least one SSB group, wherein a 2-bit reserved period of a physical broadcast channel (PBCH) included in the one or more SSBs comprises a cast-type related parameter, and a slot is configured for each beam based on the cast-type parameter, and wherein the processor performs control to determine the cast-type related parameter of a broadcast type and controls the transceiver not to transmit the information message.

8. The terminal of claim 7, wherein a beam received by the terminal has a plurality of SSB groups, and wherein the processor performs control to additionally allocate one slot to the received beam.

9. The terminal of claim 7, wherein the information message is transmitted through a physical sidelink control channel (PSCCH), the PSCCH is scrambled based on a sidelink synchronization signal (SLSS) ID, and the SLSS ID is based on the one or more SSBs.

10. The terminal of claim 9, wherein the information message comprises reserve symbol and reserve subchannel information based on the allocated resource pool information.

11. The terminal of claim 7, wherein the processor performs control to select a resource pool based on the one or more SSBs, and the resource pool is allocated based on priority of a content type of a PBCH included in SSBs in the SSB group.

12. The terminal of claim 11, wherein the resource pool is allocated based on resources of a beam different from a beam to which the received SSBs belong.

13. A first terminal comprising:

a transceiver; and a processor connected to the transceiver, wherein the processor controls the transceiver to transmit one or more synchronization signal blocks (SSBs) to a second terminal and controls the transceiver to receive an information message from the second terminal, wherein the processor controls the transceiver to transmit a sidelink synchronization signal (SLSS) and a physical broadcast channel (PBCH) based on the one or more SSBs, wherein the processor controls the transceiver to transmit control information based on a physical sidelink control channel (PSCCH), wherein the processor controls the transceiver to transmit data based on a physical sidelink shared channel (PSSCH), wherein the information message comprises slot configuration information, and the slot configuration is performed for each beam based on the number of at least one SSB group, wherein the at least one SSB group is generated by an SSB selected by the second terminal and a cyclic prefix (CP) boundary, wherein each of the at least one SSB group includes a plurality of SSBs, wherein the SSB selected by the second terminal is selected from among one or more SSBs received by the second terminal based on priority, wherein the priority is based on channel measurement and a synchronization reference, wherein a 2-bit reserved period of a physical broadcast channel (PBCH) included in the one or more SSBs comprises a cast-type related parameter, and a slot is configured for each beam based on the cast-type parameter, and wherein the cast-type related parameter of a broadcast type is determined by the second terminal, and the second terminal does not transmit the information message.

14. The first terminal of claim 13, wherein the information message is received through a physical sidelink control channel (PSCCH), the PSCCH is scrambled based on a sidelink synchronization signal (SLSS) ID, and the SLSS ID is based on the one or more SSBs.

15. The first terminal of claim 13, wherein a resource pool is selected based on the one or more SSBs by the second terminal, and the resource pool is allocated based on priority of a content type of a PBCH included in SSBs in the SSB group.

16. The first terminal of claim 15, wherein the information message comprises reserve symbol and reserve subchannel information based on the allocated resource pool information.

17. The first terminal of claim 15, wherein the resource pool is allocated based on resources of a beam different from a beam to which the received SSBs belong.

* * * * *